United States Patent
Tahar et al.

(10) Patent No.: US 9,822,760 B2
(45) Date of Patent: Nov. 21, 2017

(54) JOINED BLADE WIND TURBINE ROTOR

(71) Applicant: Joint Blade Rotor A/S, Ringkøbing (DK)

(72) Inventors: Siavash Talebi Tahar, Aalborg (DK); Ole Thybo Thomsen, Støvring (DK)

(73) Assignee: Joint Blade Rotor A/S, Ringkoebing (DK)

( * ) Notice: Subject to any disclaimer, the term of this patent is extended or adjusted under 35 U.S.C. 154(b) by 277 days.

(21) Appl. No.: 14/433,824

(22) PCT Filed: Oct. 11, 2013

(86) PCT No.: PCT/DK2013/050326
§ 371 (c)(1),
(2) Date: Apr. 6, 2015

(87) PCT Pub. No.: WO2014/056507
PCT Pub. Date: Apr. 17, 2014

(65) Prior Publication Data
US 2015/0275856 A1    Oct. 1, 2015

(30) Foreign Application Priority Data
Oct. 12, 2012   (DK) ................................ 2012 00630

(51) Int. Cl.
*F03D 1/06* (2006.01)
(52) U.S. Cl.
CPC ......... *F03D 1/0675* (2013.01); *F03D 1/0633* (2013.01); *F03D 1/0658* (2013.01);
(Continued)

(58) Field of Classification Search
CPC .... F03D 1/0658; F03D 1/0675; F03D 1/0633; F05B 2240/301; F05D 2240/30; F05D 2240/302; F05D 2250/21; Y02E 10/721
See application file for complete search history.

(56) References Cited

U.S. PATENT DOCUMENTS

| | | | |
|---|---|---|---|
| 4,081,221 A | | 3/1978 | Andrews |
| 7,381,029 B2 * | | 6/2008 | Moroz ................. F03D 1/0675 |
| | | | 416/132 B |

(Continued)

FOREIGN PATENT DOCUMENTS

| | | |
|---|---|---|
| EP | 0 009 767 A2 | 4/1980 |
| EP | 1 365 106 A1 | 11/2003 |

(Continued)

OTHER PUBLICATIONS

International Search Report dated Jan. 21, 2014 for International Application No. PCT/DK2013/050326.

*Primary Examiner* — Igor Kershteyn
(74) *Attorney, Agent, or Firm* — Brinks Gilson & Lione

(57) ABSTRACT

The present invention preferably relates to a joined blade rotor system having substantially a horizontal axis for a wind turbine including a number of joined blade assemblies extending substantially radially from a central hub wherein each joined blade assembly includes a first blade and a second blade or more blades in different planes that are connected by one or more brace systems to each other. Each central hub includes an operating member to effect pitch rotation of the joined blade assembly or directly the first blade pitch rotation and the second blade pitch rotation about the respective blade axis. A bearing provides a relative rotation between the first or second blade and brace strut while pitch angles change.

28 Claims, 22 Drawing Sheets

(52) U.S. Cl.
CPC ........ *F03D 1/0691* (2013.01); *F05B 2240/30* (2013.01); *F05B 2240/301* (2013.01); *F05B 2240/302* (2013.01); *F05B 2250/21* (2013.01); *Y02E 10/721* (2013.01)

(56) References Cited

U.S. PATENT DOCUMENTS

2009/0035133 A1    2/2009   Ferman
2009/0081047 A1    3/2009   Koike

FOREIGN PATENT DOCUMENTS

| | | |
|---|---|---|
| EP | 2 112 372 A1 | 10/2009 |
| GB | 735 111 A | 8/1955 |
| WO | WO 86/02701 A1 | 5/1986 |
| WO | WO 2007/135391 A2 | 5/2007 |
| WO | WO 2010/053450 A2 | 5/2010 |
| WO | WO 2011/053177 A1 | 5/2011 |

\* cited by examiner

JOINED BLADE WIND TURBINE ROTOR

This application claims the benefit under 35 U.S.C. §371 of International Application No. PCT/DK2013/050326, filed Oct. 11, 2013, which claims the benefit of Danish Patent Application No. PA 2012 00630, filed Oct. 12, 2012 which are incorporated by reference herein in their entirety.

FIELD OF INVENTION

The present invention relates to a joined blade rotor construction for horizontal axis wind turbines, and more particularly to one having low weight, high fatigue life and high aerodynamic efficiency.

BACKGROUND TO THE INVENTION

Recently wind turbines have been designed to harvest the kinetic energy from the wind and convert this kinetic energy into electrical energy. The preferred type of wind turbine for electricity generation applications is a horizontal axis wind turbine (HAWT). The size of wind turbines and constituting components like blades grow up quickly. As blades grow larger, the amount of reinforcement increases in a logarithmic progression. Size and cost of blades can be reduced using rotor/blade supporting means.

WO/1986/002701A1 discloses a rotor system comprising some securing members that are connected to outermost part of blade roots and support the variable-pitch blades on the rotor in a stable manner without using heavy and expensive bearing means. The problem of applying the solution described in WO/1986/002701A1 to a large wind turbine is that the securing mechanism do not support the main part of blades thus weight and cost of blades are high.

WO 2007/135391 describes a turbine blade support assembly that comprises a central hub and a plurality of carrying members extends outwardly from the central hub. A respective subsidiary hub is provided on each of the carrying members for securing a respective turbine blade to each carrying member. A plurality of support members is provided to support the carrying members. The problem of this invention is that the securing formation supports the subsidiary hubs only and turbine blade are not supported and can be heavy and expensive in a large wind turbine rotor. This problem can be managed using longer carrying members and shorter blades. But this configuration causes a higher aerodynamic drag and lower aerodynamic efficiency of the rotor system.

EP 2 112 372 A1 discloses a horizontal axis wind turbine rotor that each blade is supported on the leeward side and possibly windward side by some supporting means having a first end and a second end. The first end being connected to the blade at a first mounting point positioned in a radial distance from the horizontal axis, and the second end being connected to a second mounting point at a rotatable part of the wind turbine, the second mounting point being positioned in an axial distance from the rotor plane on the leeward or windward side of the rotor. The problem of this invention is that the supporting means generate extra noise as well as extra drag that reduce rotor aerodynamic efficiency. Moreover during the variation of blade pitch angle, internal load of supporting means change and restrict securing effect of supporting means. Meanwhile twisting effect of supporting member loads on the blade should be considered.

EP1365106A1 discloses a rotor system comprising a rotatable supported central hub, and a plurality of blades formed on the central hub at a plurality of circumferential locations and protruding radially outward. The blades each include a first blade element extending radially outward from a first attachment position on the central hub, a second blade element extending radially outward from a second attachment position on the central hub, and a third blade element connecting the tips of the first and second blade elements. The problem of applying this solution is that the blade tip is not very effective point for connecting the first and second blade portions to improve stiffness of blades in a large wind turbine with large and slender blades. Also the blade pitch variation is not possible thus this invention cannot be used in the large and high performance wind turbines.

It is well known from the aircraft industry that aeroplanes built with two joined wings show normally higher aerodynamic efficiency (low induced and airfoil drags) and lower structural weight due to supporting effect of joined wings. An objective of this invention is to provide a similar joined blade rotor system to improve aerodynamic efficiency and to reduce structural weight of the rotor system.

Hence, an improved blade rotor system would be advantageous, and in particular a more efficient and/or reliable blade rotor system would be advantageous.

OBJECT OF THE INVENTION

It is a further object of the present invention to provide an alternative to the prior art. In particular, it may be seen as an object of the present invention to provide a blade rotor system that solves the above mentioned problems of the prior art. A further or alternative object of the invention is to provide a new light weight, low cost and high efficiency rotor system for horizontal axis wind turbine (HAWT).

SUMMARY OF THE INVENTION

Thus, the above described object and several other objects are intended to be obtained in a first aspect of the invention by providing a joined blade rotor system to install or being installed on a horizontal axis wind turbine. The rotor system may preferably comprise a number of joined blade assemblies extending radially from a central hub having a substantially horizontal axis. Each joined blade assembly may preferably comprise at least two blades, a first blade and a second blade (or may comprise more blades) in different rotor planes. The first and second blades may preferably be connected by one or more brace systems to each other.

The brace systems may preferably comprise brace struts that are hinged or rigidly connected to second blade and are hinged or rigidly connected to first blade.

The first blade(s) and the second blade(s) may preferably be connected to a central hub directly or using a root mounting and pitch bearings with a gap and a stagger distances.

Terms used herein are preferably used in manner being ordinary to a skilled person. However, for sake of clarity some of these are elaborated below:

Front and back are typically used to orientate a member e.g. a front tube, front blade etc. relatively to the orientation or intended orientation of the member relatively to the incoming wind during use. This means typically that front typically refers to a member being arranged upstream of another member, and back typically refers to a member being downstream of another member. Similarly, when used e.g. in "front brace link" front typically refers to the rotational direction of the element in the sense that front preferably refers to leading/foremost element.

Inward as used in e.g. inward sections of the first blade preferably refers to the side of the blade facing e.g. the second blade (and vice versa for the second blade). Outward is preferably opposite to inward.

As presented above, an object of the invention may be to provide a new light weight, low cost and high efficiency rotor system for horizontal axis wind turbine (HAWT).

According to an embodiment of invention, this object is achieved by means of a rotor with at least two joined blade assemblies but normally three joined blade assemblies, characterized by the fact that each joined blade assembly comprised two or more blades in different rotor planes that are connected by one or more brace systems to each other. Brace systems connect first blade and second blade to each other. First and second blades are connected to a central hub with a gap and a stagger distances between blades. Said gap and stagger are controlled along the joined blade assembly by brace mechanisms.

Flap-wise and edge-wise bending strength and rigidity of joined blade assembly are improved by gap and stagger distances, respectively. Moreover blades torsional stiffness cab be intensified in a joined blade assembly.

In accordance to an objective of present invention, joining the blades increases bending and torsional strength of blade assembly, therefore weight and consequently cost of blade structures dramatically decrease. Meanwhile weight and cost of mechanical and structural parts of wind turbine related to rotor weight. Therefore weight and cost of many parts of a wind turbine using present inventory rotor system decrease.

Power coefficient Cp is defined as the ratio between the actual power obtained and the maximum available power. A theoretical maximum Cp for planar wind turbine rotor exists, denoted by the Betz limit, $Cp_{max}=0.593$. Practically optimized conventional wind turbines operate Cp near to 0.5. Drop in Cp comes from limit number of blades and blade airfoil drag. The Betz limit theoretically can be exceeded using non-planar rotor and also multi actuator disk rotor system. According to embodiments of the present invention, joined blade rotor uses double actuator non-planar disk rotor that ideally can exceed the Betz limit. Therefore joined blade rotor system increases power generated due to non-planar and double actuator disk effects.

The power coefficient, Cp is dependent on the ratio between the tangential velocity of the rotor blade tip to the undisturbed axial wind airflow and is called the tip speed ratio, λ. Optimum tip speed ratio for modern large three bladed wind turbines to get maximum power coefficient is about 6 or 7. Also rotor blades become slender when the design tip-speed ratio increases. It is obvious that the construction of a slender blade is associated with problems of strength or stiffness. According to the present invention, optimum tip speed ratio is about two times of similar conventional rotors. Moreover, high strength and stiffness of joined blade assembly lets to use slender blades. Rotational torque of the rotor is related to inverse of tip speed ratio at a specific power. Therefore rotor aerodynamic loads and input torque into the drive train directly reduce by increasing the tip speed ratio. Consequently, weight of the rotor and other mechanical parts like low speed shaft and gearbox reduce.

An important parameter of the implemented airfoils in order to improve aerodynamic efficiency of wind turbine blade is characterized by the lift-to-drag ratio, L/D.

Due to the circular cross-section of conventional blades, the root area does not contribute to the production of the wind turbine and, in fact, reduces the production a little because of wind resistance. Also due to aeroelastic influences, low cambered airfoils should be used in outward region of blades that have limited L/D. In present invention, because of high bending stiffness of joined blade assembly, blades use low thickness ratio, t/c airfoils even near to the blade root that reduce airfoil drag coefficient, Cd and improve L/D. Also high torsional stiffness of blade let to use highly cambered airfoils with high aerodynamic torsional coefficient, Cm even near to the tip that have higher lift, L and L/D than low cambered airfoils with similar thickness ratio. In addition, conventional rotor blades are subject to aeroelastic influences and blade tip vibrates and generates vortexes around the airfoils. Such vortexes cause extra drag and noise. Also these vibrations cause fatigue in blades and other parts of wind turbine. Present invention provides high stiffness for blade assembly that controls these vibrations and reduces blade drag, fatigue and noise.

Conventional wind turbine blades use low cambered airfoils especially in outward region of blade. Wind shear and wind turbulence on the blade profiles change airfoils angle of attack, α during rotation of wind turbine rotor. α is adjusted by blade pitch control system that most of the times is the angle of attack for maximum L/D condition, $α_{design}$. By oscillation of the angle of attack, aerodynamic load on the blade fluctuates above and below an average load and causes fatigue in the blade. In present invention highly cambered airfoil is preferably used that have an angle of maximum L/D very near to the airfoil stall angle, $α_{stall}$. Therefore by increasing the angle of attack due to the wind speed variations, airfoil stalls and aerodynamic load drops and upper fatigue load decreases inherently that increases life time and decreases the weight of the wind turbine components.

Further embodiments and aspects are presented below.

BRIEF DESCRIPTION OF THE DRAWINGS

The present invention will be hereinafter described with reference to the accompanying drawings which illustrate preferred embodiments of the invention. The drawings however are merely illustrative of how the invention might be put into effect, so that the specific form and arrangement of the features shown is not to be understood as limiting on the invention.

Figure 1:
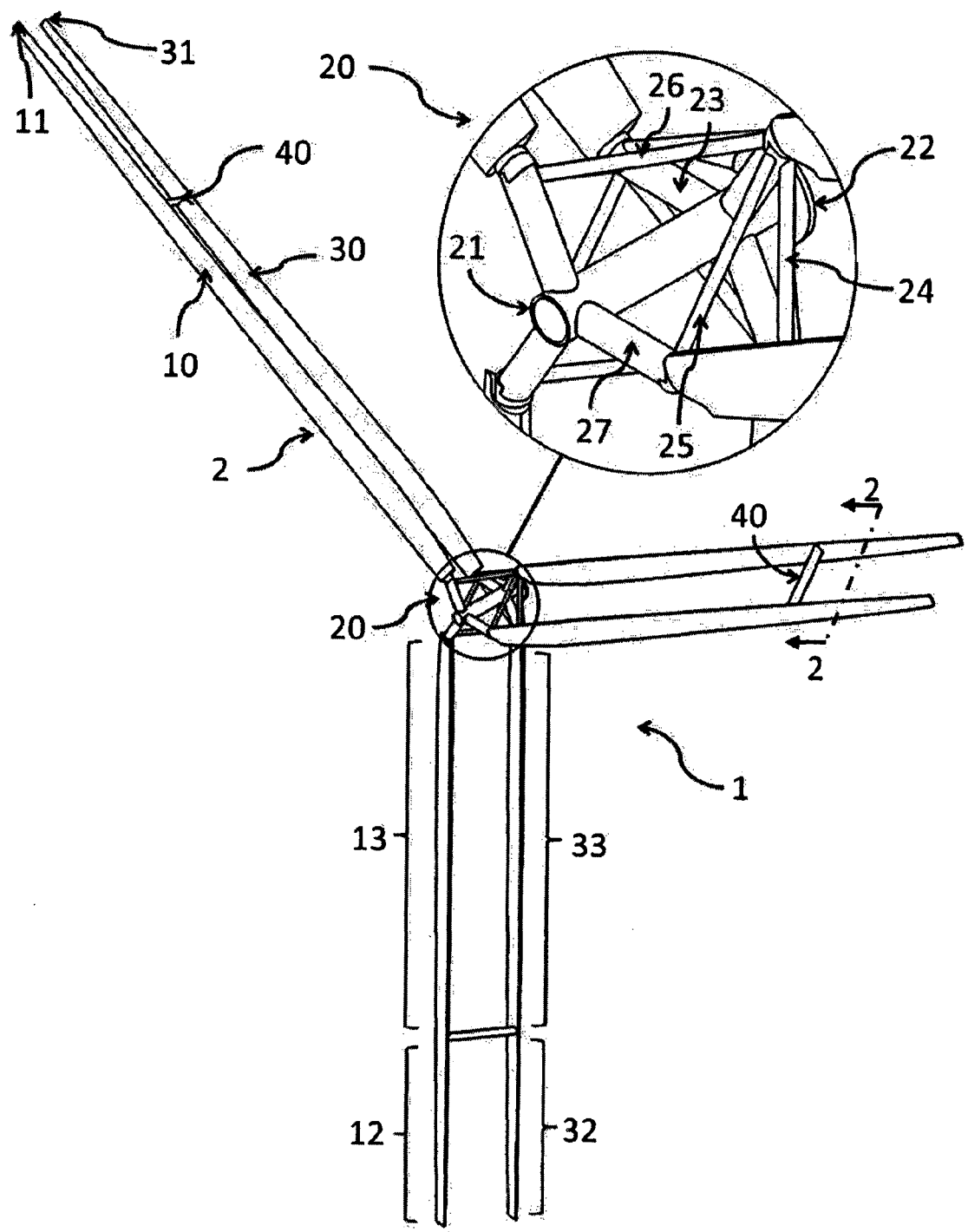
FIG. 1 is a perspective view of the main embodiment of the joined blade assembly rotor for horizontal axis wind turbine.
Figure 13:
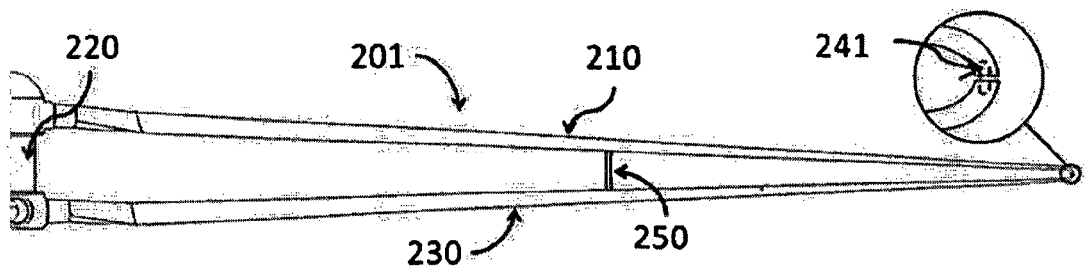
FIG. 13 is the fourth embodiment of the invention with a V-shaped joined blade assembly that tip of the blades bended toward each other and are connected with a vertical axis joint to provide flexibility for pitch variation of blades.
Figure 16:
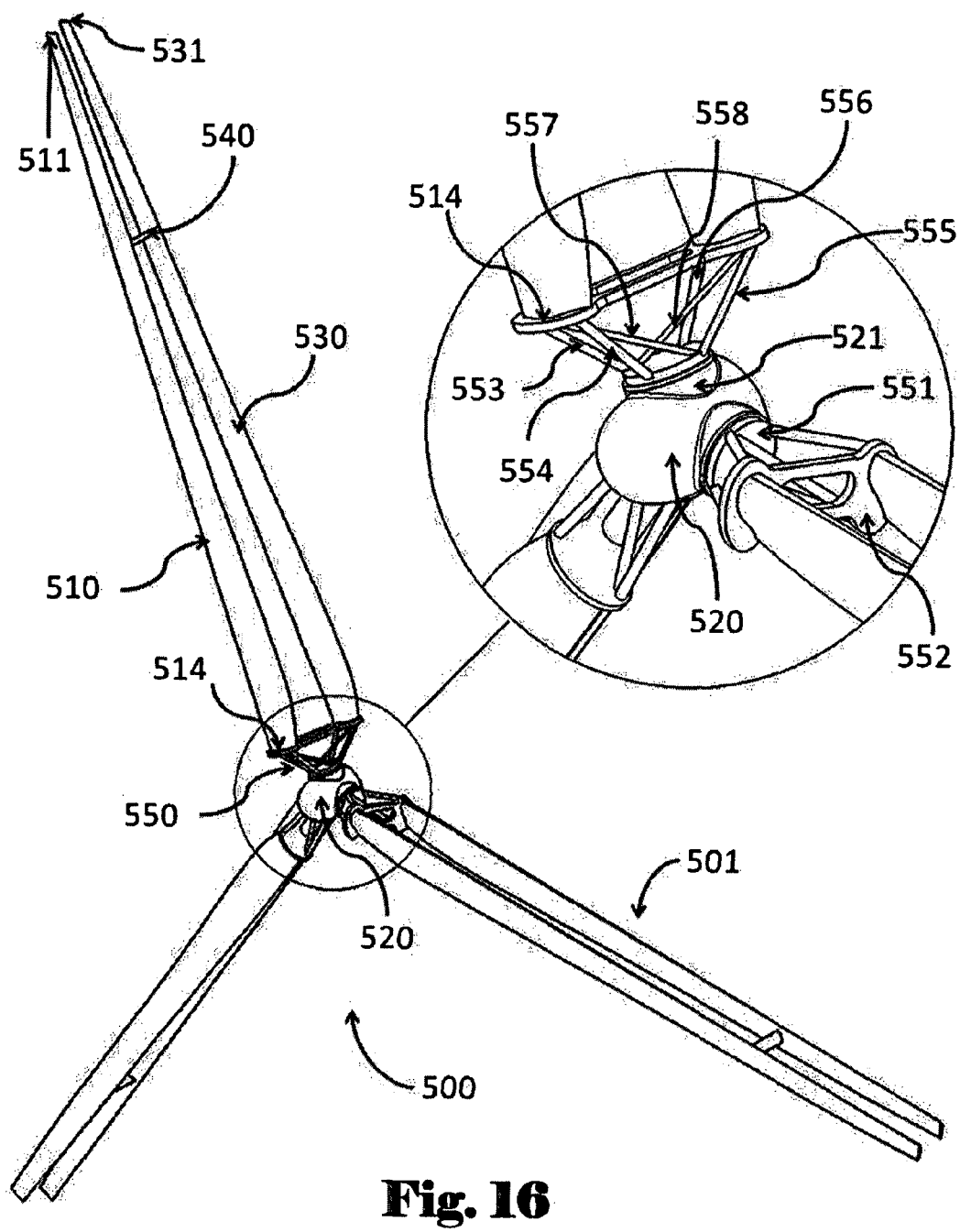
FIG. 16 is a perspective view of seventh embodiment of the joined blade rotor system using a root mounting frame to carry joined blade assembly.
Figure 22:
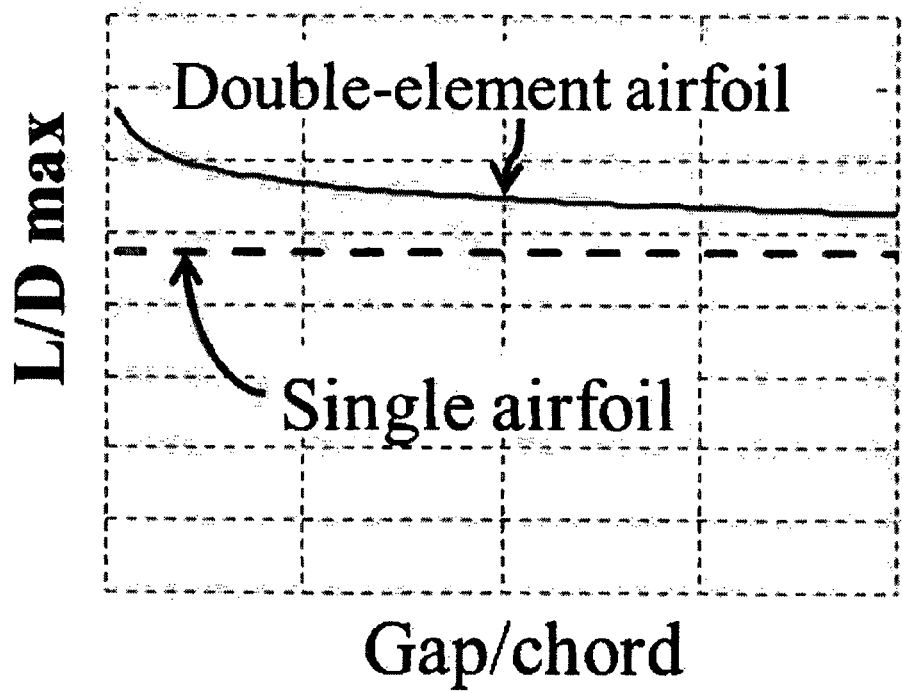
Figure 23:
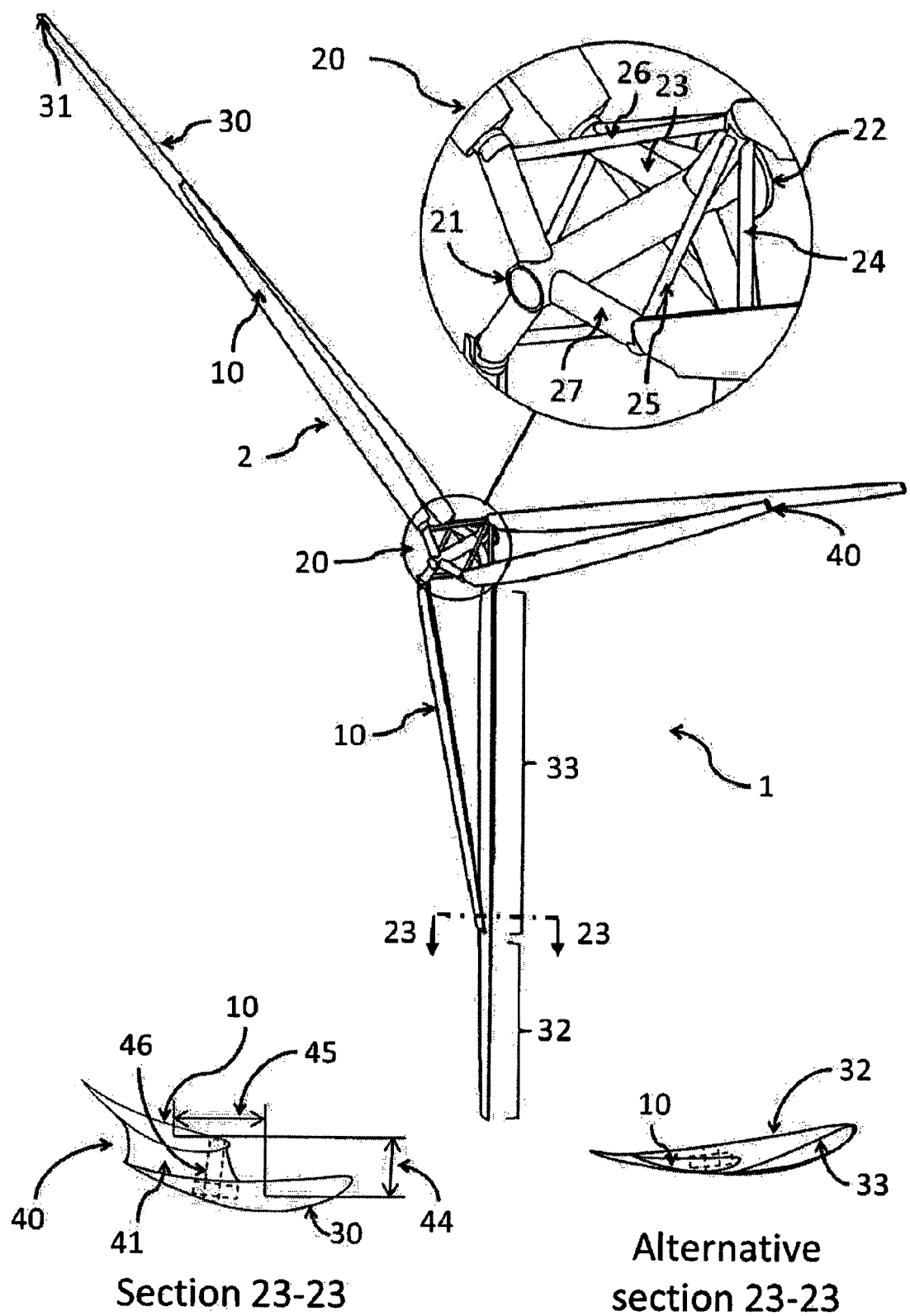
Figure 24:
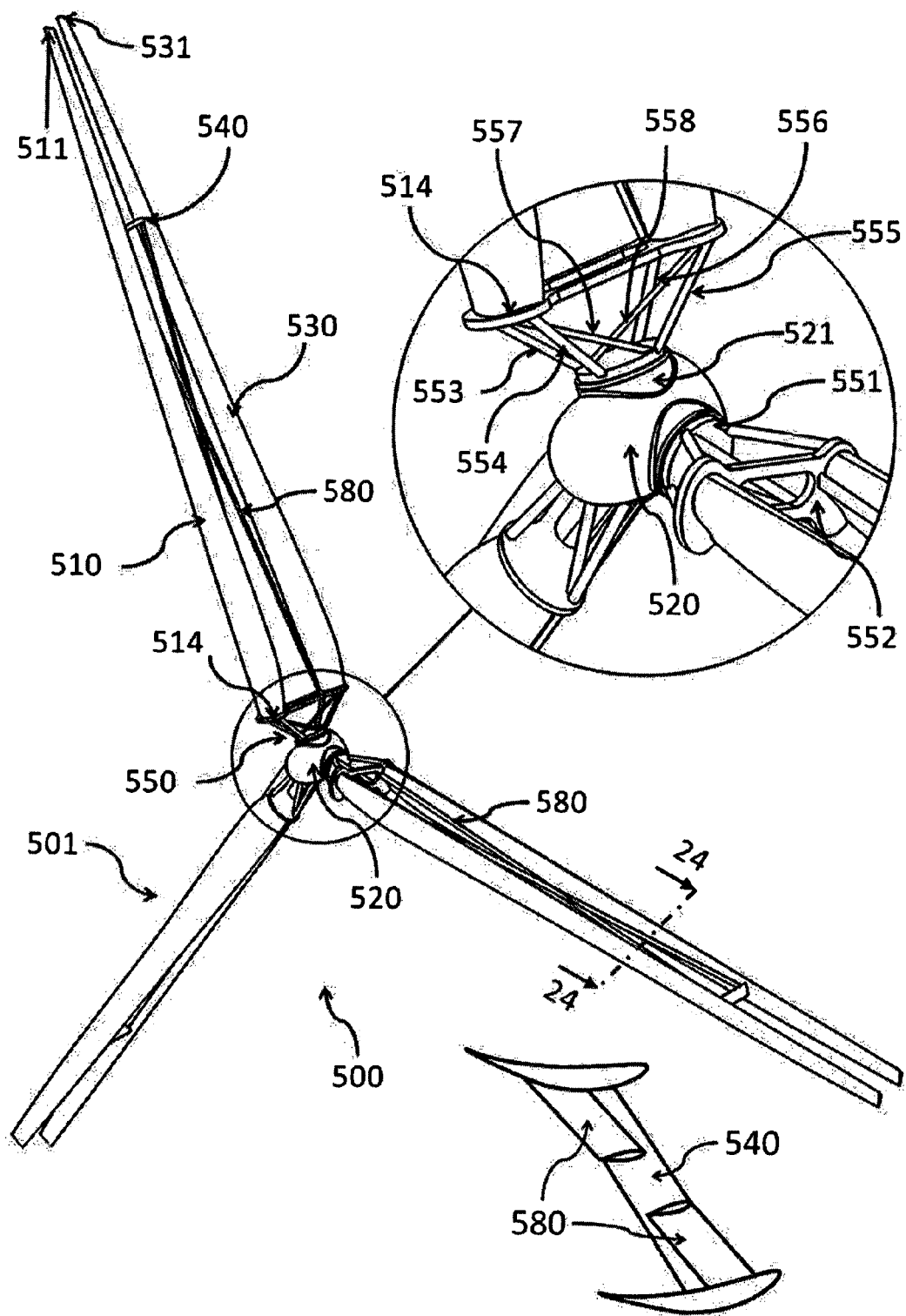
Figure 25:
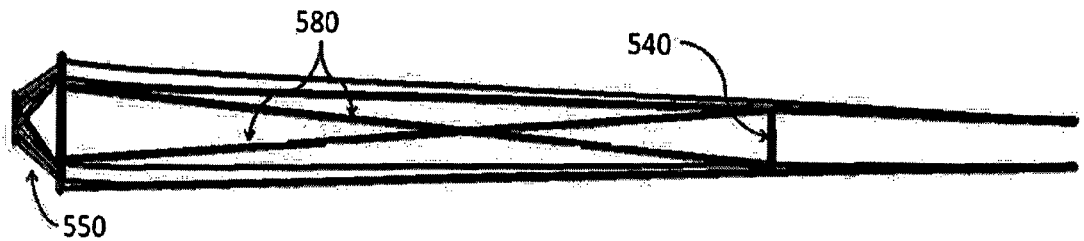
Figure 25A:
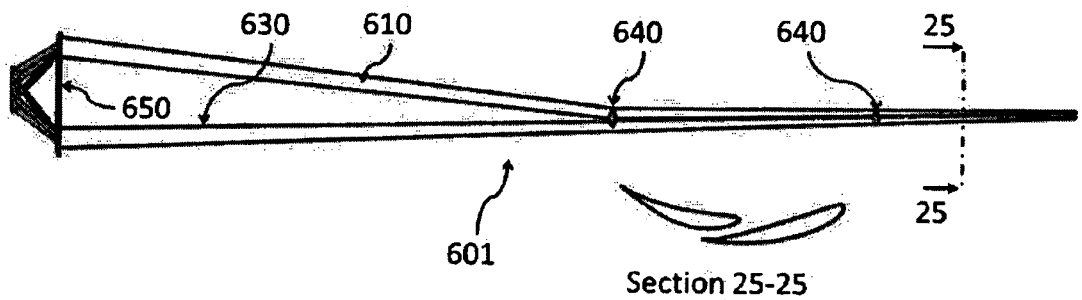
Figure 25B:
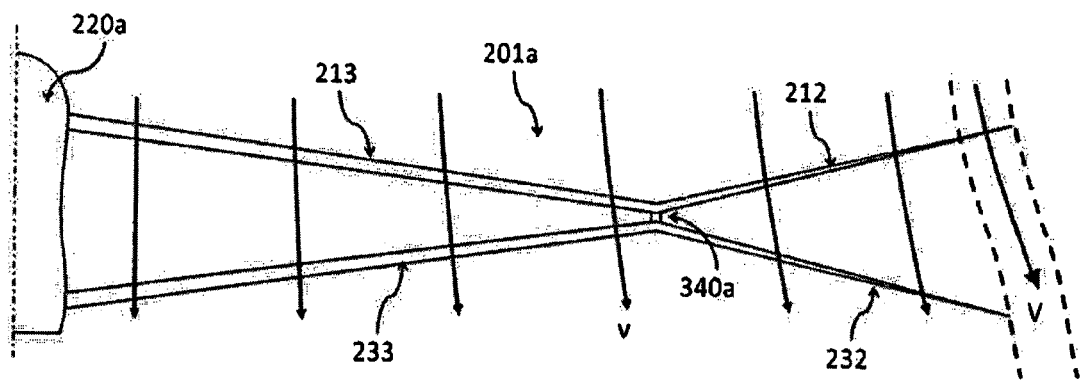
Figure 26:
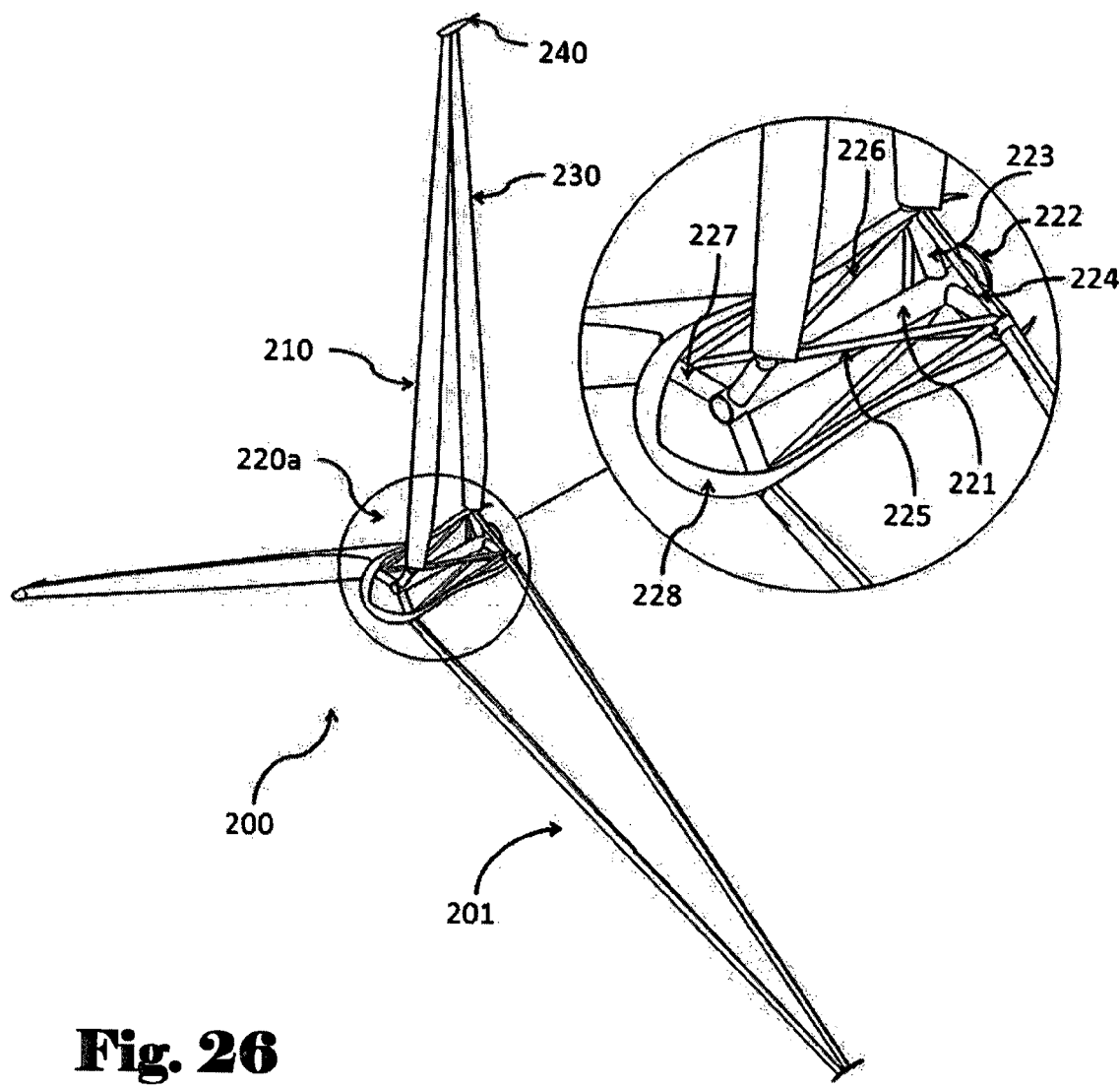
Figure 27:
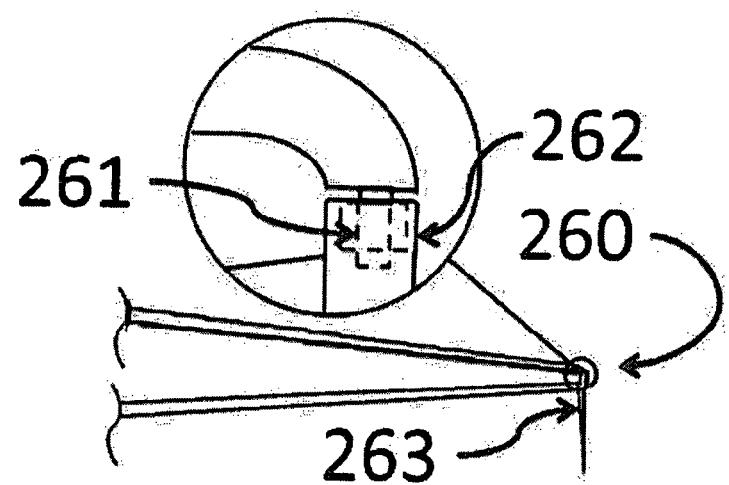
Figure 28:
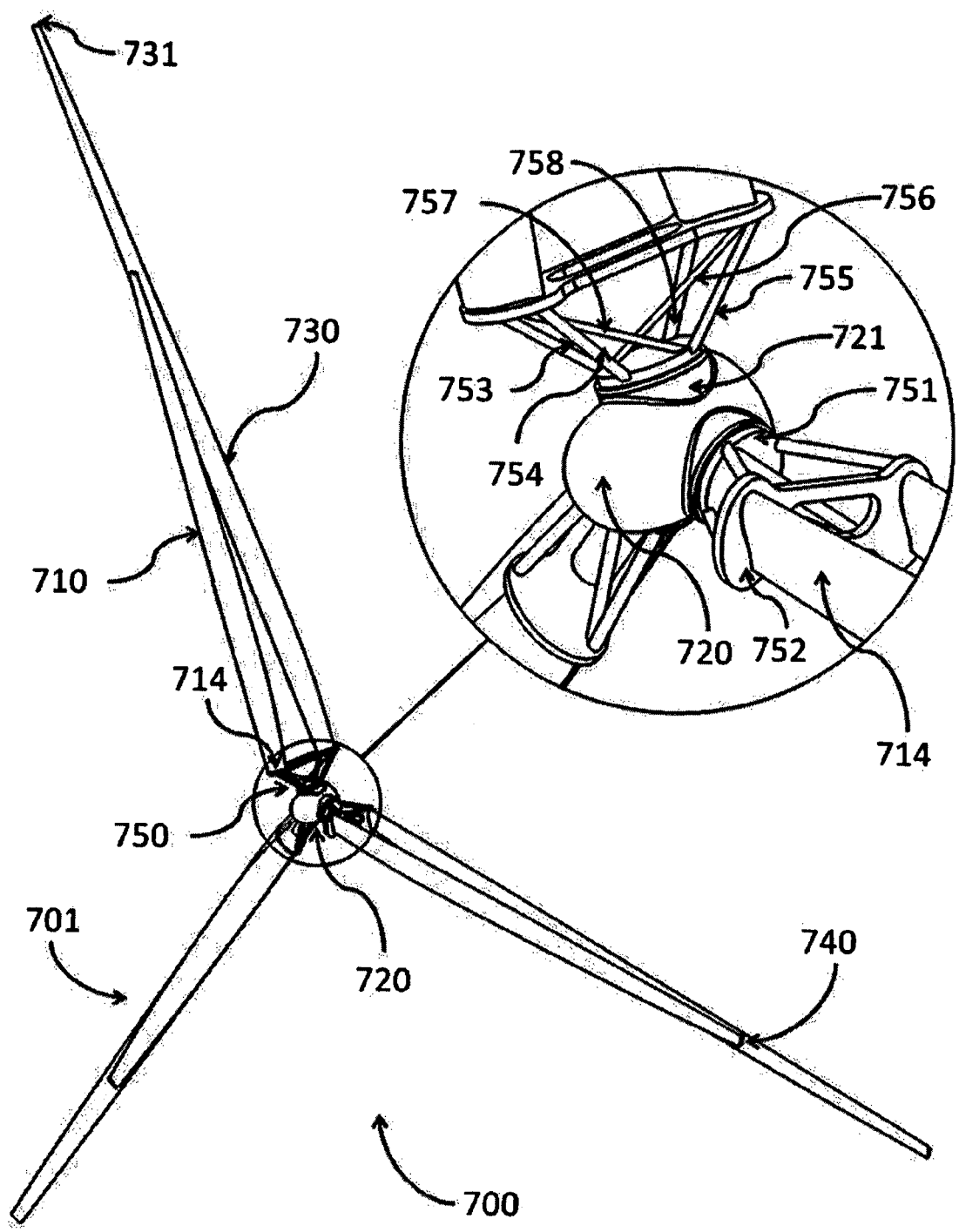
Figure 29:
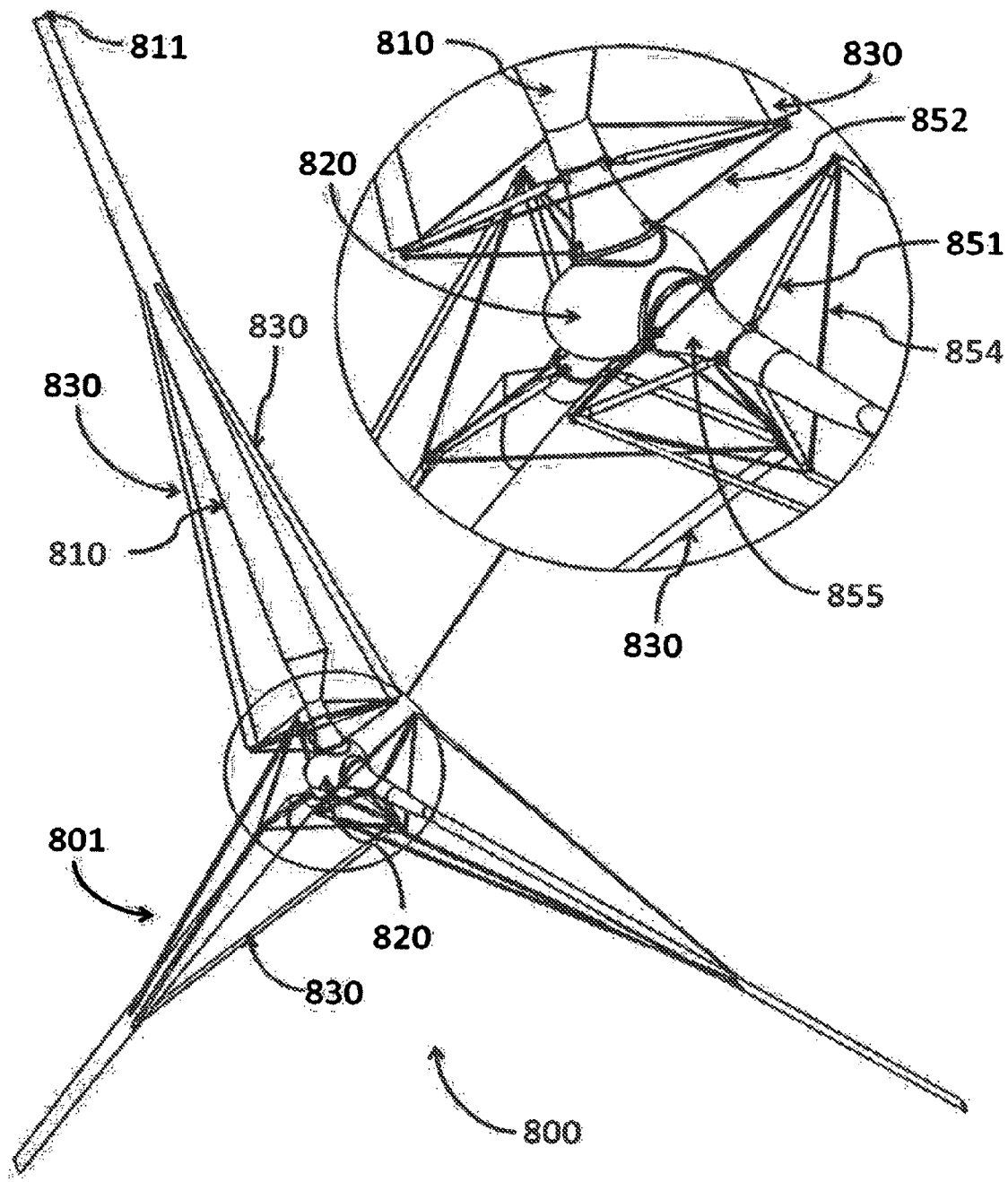
Figure 30:
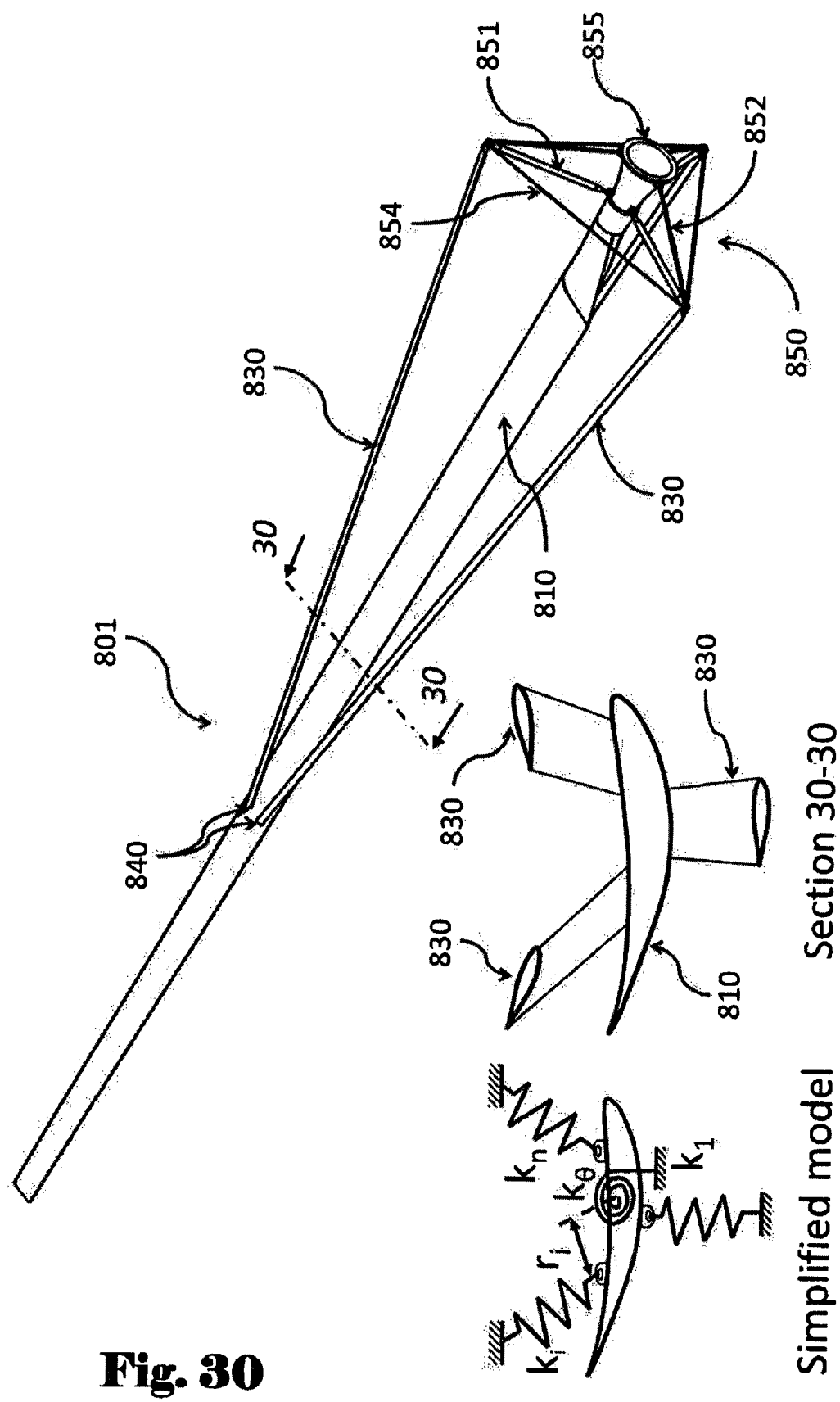
Figure 31:
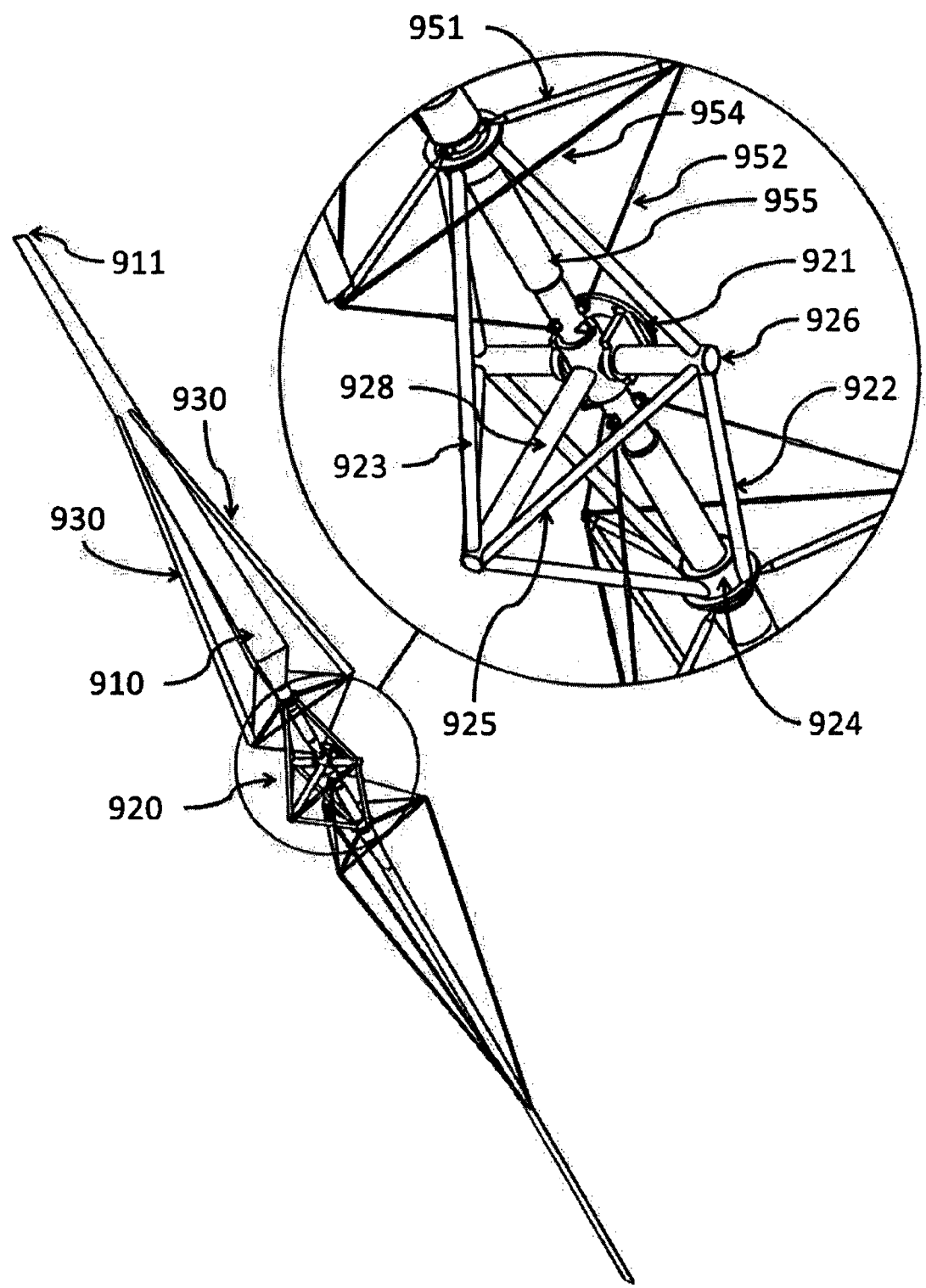
Figure 32:
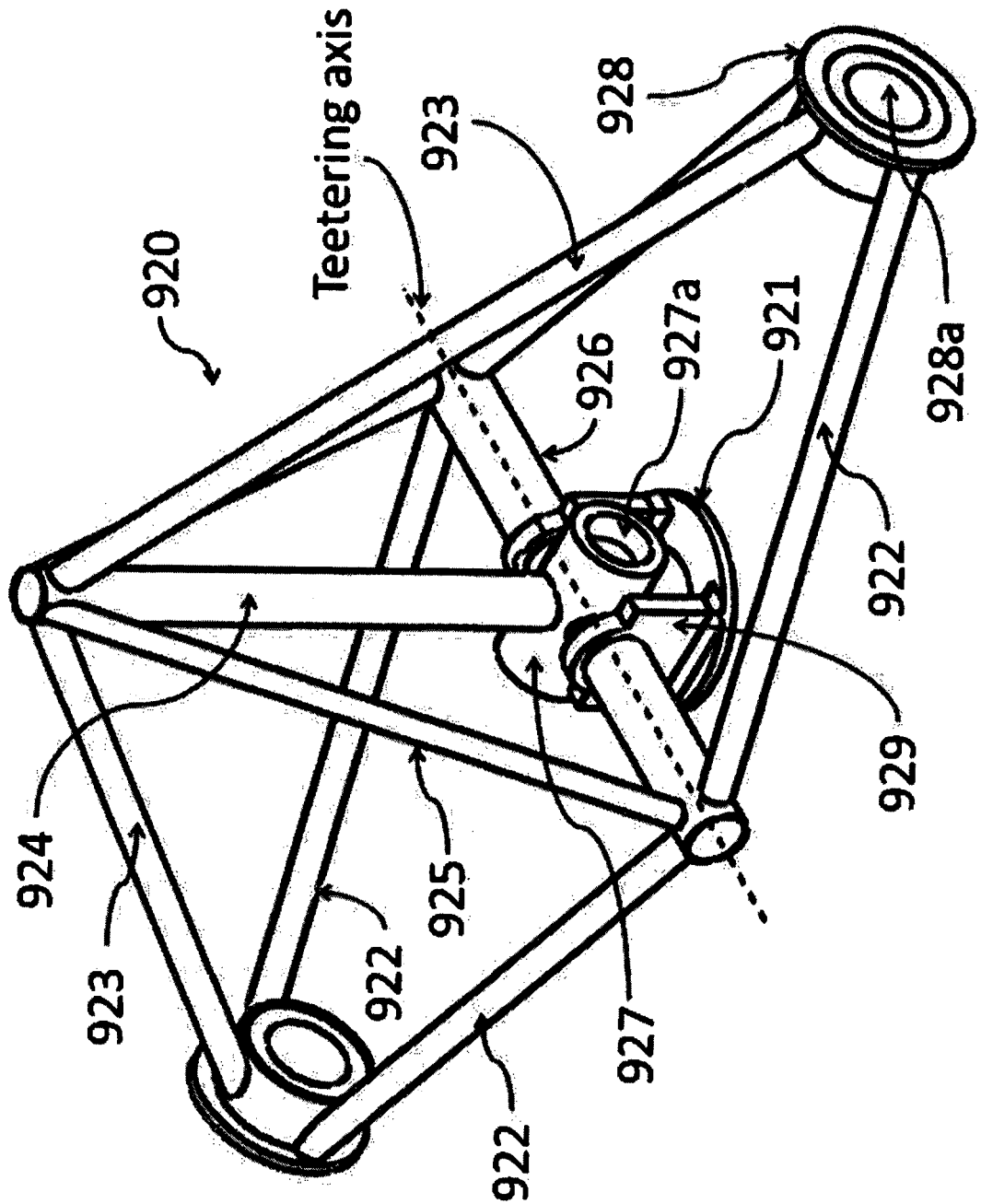
Figure 33:
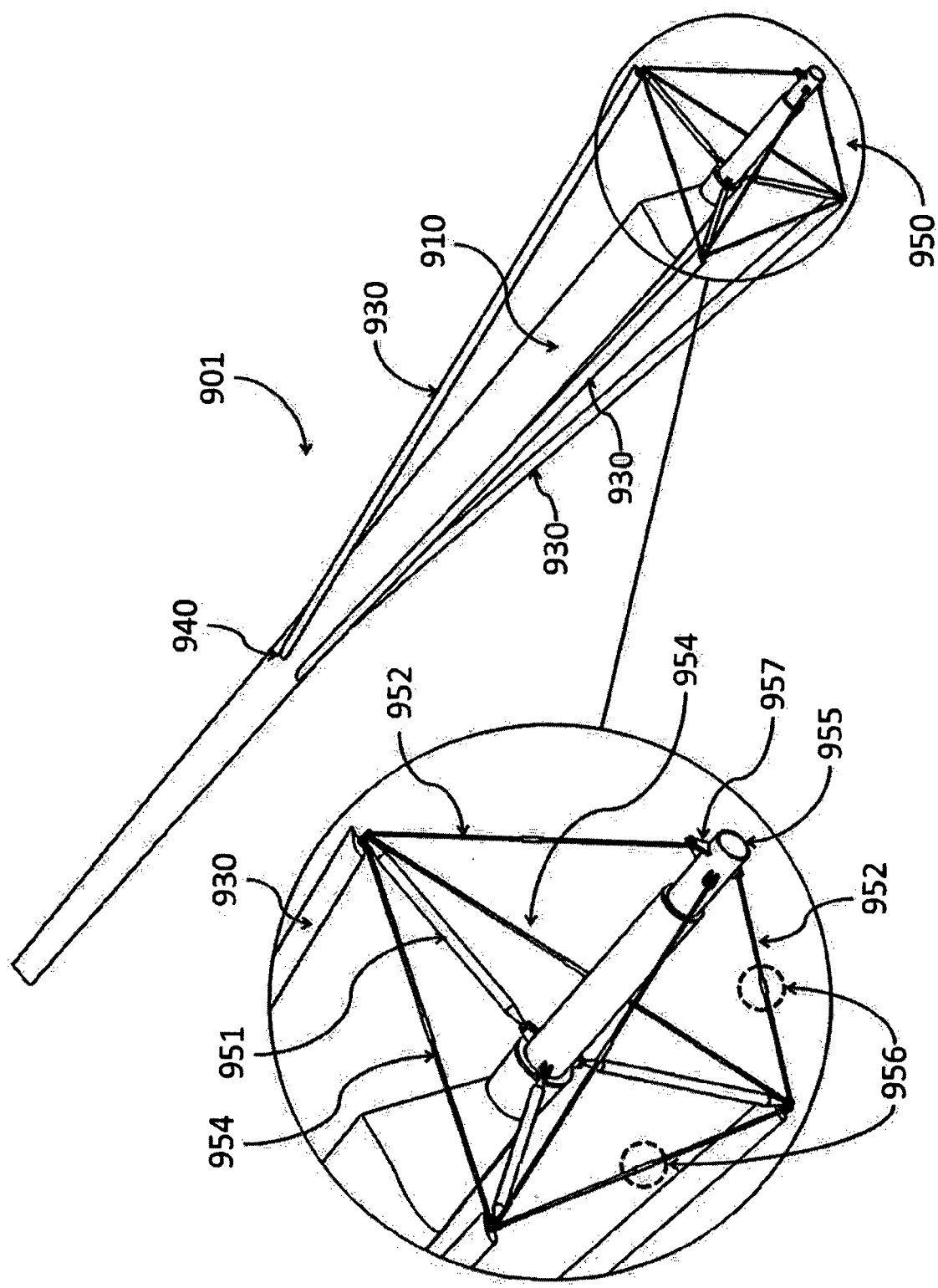

Effect of gap ratio on aerodynamic efficiency of double-elements airfoil system illustrated in FIG. 22;

FIG. 23 is a modified configuration of the first embodiment of FIG. 1 using Y-shaped joined blade assembly;

FIG. 24 is a modified configuration of the seventh embodiment of FIG. 16 using cross blades;

FIG. 25 is a side view of joined blade assembly of FIG. 24;

FIG. 25a and FIG. 25b are modified configurations of seventh and fourth embodiments, respectively;

FIG. 26 is a perspective view of a modified shape of the fourth embodiment of FIG. 13 using a long truss-hub and winglet;

FIG. 27 is an alternative form of blade tip connection and winglet of FIG. 13;

FIG. 28 is a perspective view of a modified form of seventh embodiment of FIG. 16 using Y-shaped joined blade assembly;

FIG. 29 is a perspective view of eighth embodiment of the invention using multi-blade joined blade assembly;

FIG. 30 is a perspective view of multi-joined blade assembly of FIG. 29;

FIG. 31, FIG. 32 and FIG. 33 are perspective views of ninth embodiment of present invention using multi-joined blade assembly and truss-hub.

DETAILED DESCRIPTION OF PREFERRED EMBODIMENTS OF THE INVENTION

Referring now to the drawings in which like numerals represent like elements throughout the several views, the embodiments of the present invention will be described. Objects of present invention are achieved by means of a rotor with at least two joined blade assemblies 2 but normally three joined blade assemblies 2 as shown in FIG. 1, characterized by the fact that each joined blade assembly, 2 comprised two blades 10 and 30 or more blades in different rotor planes that are connected by one or more brace systems 40 to each other.

Figure 2:
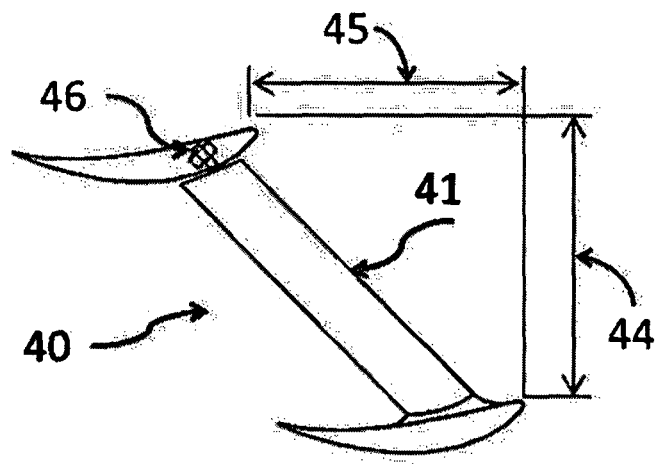
FIG. 2 is a sectioned view of the taken on lines 2-2 of FIG. 1 and illustrating the brace system mechanism and cross sections of blades.
Figure 3:
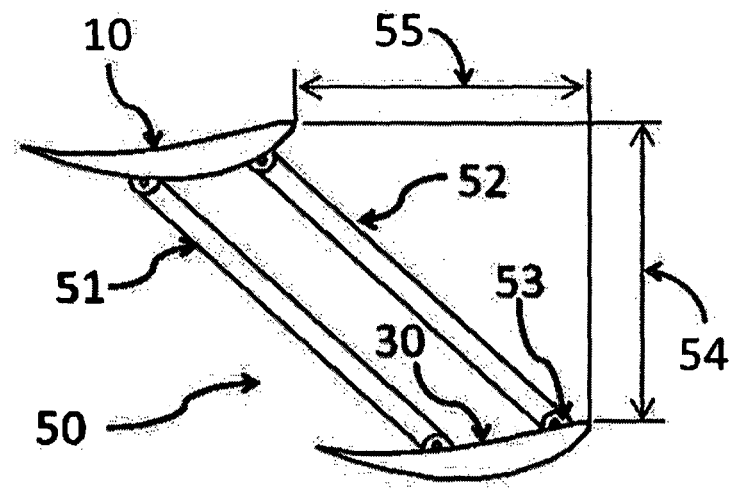
FIG. 3 depicted an extra auxiliary brace system section view may connects mid-section of blades in FIG. 1.

According to a main embodiment of invention, brace system comprising a brace strut 40 is hinged (or rigidly connected) to first blade 10 and is hinged (or rigidly connected) to second blade 30 using rigid connection or the hinged connection 46 that is shown in FIG. 2. Brace mechanism controls gap 44 and stagger 45 dimensions when pitch angle of blades change by blade pitch control system. FIG. 3 shows an auxiliary brace system that may connects mid-sections of the blades and divide each blade to two parts including inward sections 13 & 33 and outward sections 12 & 32. Auxiliary brace system comprised two brace links 51 and 52 are connected to first blade 10 and second blade 30 using the hinged lugs 53.

Figure 4:
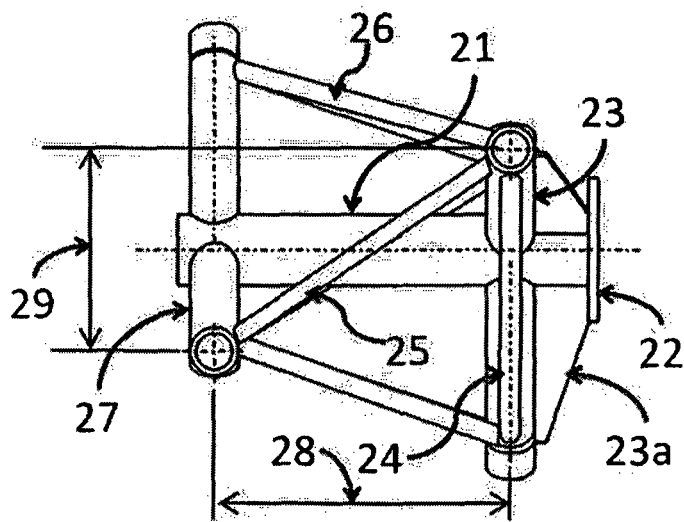
FIG. 4 shows side view of light weight rotor truss-hub comprising tubular truss elements.

First and second blades are connected to a central truss-hub 20 with a gap 28 and a stagger 29 distances as shown in FIG. 4. Truss-hub is a truss frame structure comprising central shaft 21 connected to radial extended front and back tubes 27 & 23. Back radial tubes are reinforced by tubular elements 24 and plates 23a. Also front and back radial tubes are connected to each other using tubular elements 25 & 26. Flange 22 is connected to central shaft 21 and supporting plates 23a in order to connect the hub to the wind turbine drive train.

Figure 5:
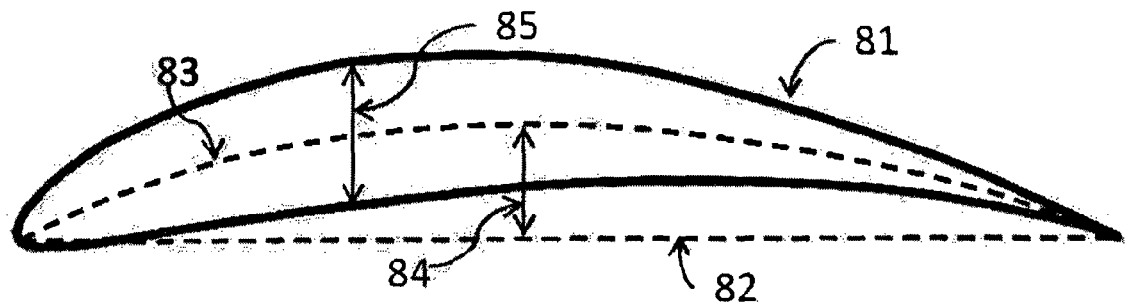
FIG. 5 shows a cross section of blade taken in a perpendicular plane to the longitudinal axis of blade.

In the FIG. 5, blade profile section 81 taken in a plane oriented perpendicular to longitudinal axis of blade and it is called airfoil section of blade at the orientation plane. The profile 81 of the blade has a chord (c) 82 that is a straight line connecting the leading edge to trilling edge of the airfoil. Maximum thickness 85 is represented as thickness ratio (t/c) by dividing to chord 82 and expressed as percentage. Mean camber line 83 is a line passing through centre of local airfoil thicknesses and maximum camber 84 is represented as camber ratio by dividing to chord 82 and expressed as percentage. Profile section 81 is a highly cambered airfoil and low thickness ratio that is able to generate a high design lift coefficient, $CL_{design}$ (CL at maximum L/D) and high L/D. A practical range for high aerodynamic performance airfoils are camber ratio and thickness ratio 2-6% and 10-20%, respectively. Higher L/D improves Cp of wind turbine significantly also higher $CL_{design}$ directly reduces optimum chord length 82 distribution that reduces weight of the blade.

Figure 6:
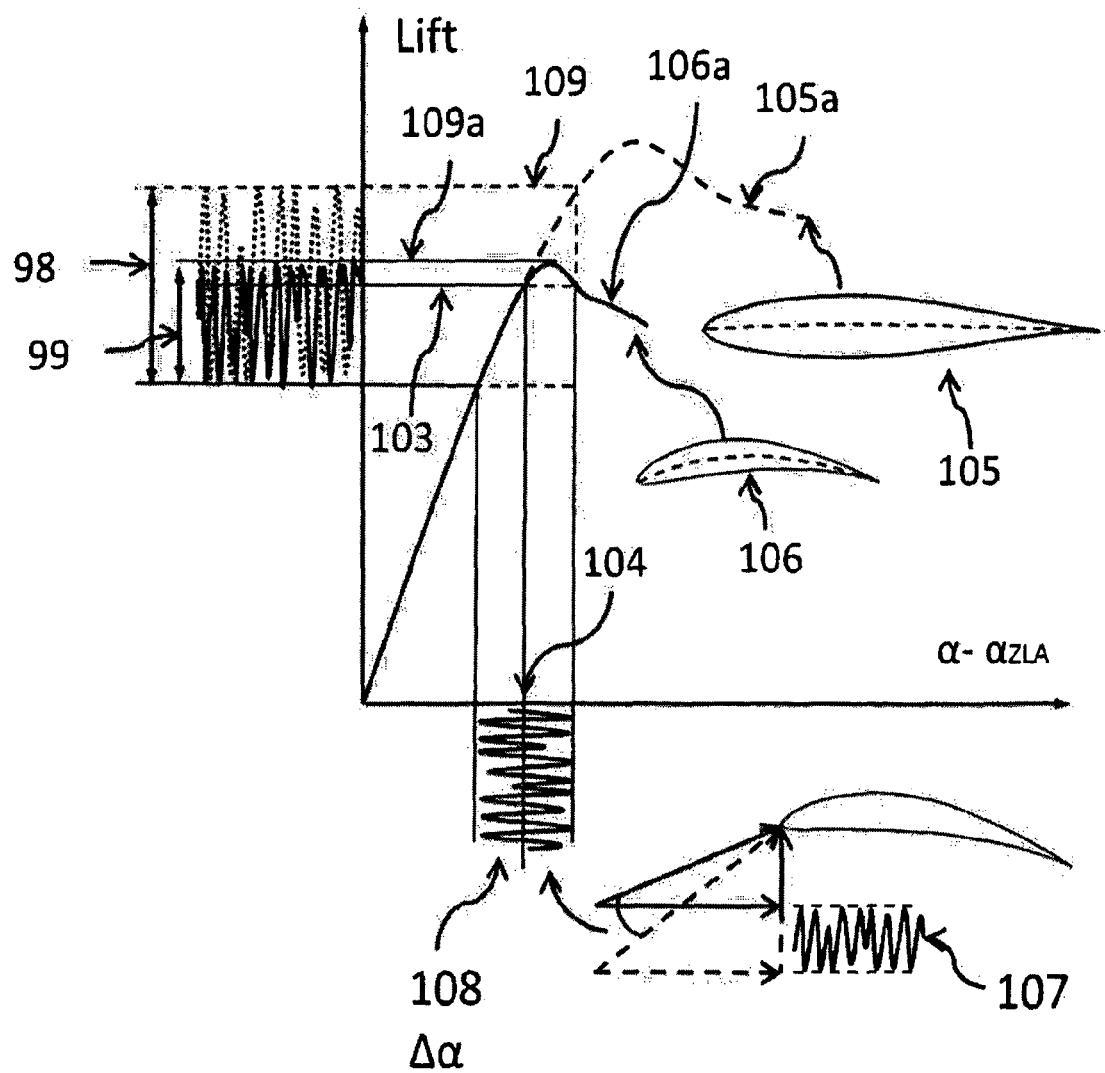
FIG. 6 is a schematic illustration of aerodynamic fatigue load reduction using highly cambered airfoil.

Highly cambered airfoils usually have a $CL_{design}$ near to the $CL_{max}$. This property will reduce fatigue load in joined blade assembly 101 as shown in FIG. 6 schematically. During the rotation of wind turbine rotor, wind speed changes over each blade due to non-uniform wind speed profile and wind turbulence. Wind speed variation 107 changes axial component of relative airspeed over airfoils of blade and consequently causes an airflow angle of attack variation 108, $\Delta\alpha$ and angle of attack fluctuates around design airfoil angle, $\alpha_{design}$ (angle of attack which produce maximum L/D). Zero lift angle, $\alpha_{ZLA}$ is an angle of attack that an airfoil produces zero lift. A relative angle 104 ($\alpha_{design} - \alpha_{ZLA}$) is shown over horizontal axis and a relevant lift load 103 is achieved by both low and high camber airfoils 105 and 106 from relevant lift curves 105a and 106a. Stall angle, $\alpha_{stall}$ is an angle of attack that airfoil lift curve loses initial slope and aerodynamic lift decreases. Highly cambered airfoils have a $\alpha_{design}$ near to the $\alpha_{stall}$ therefore in case of upper limit of α due to wind speed fluctuation, low camber airfoil 105 produces high lift load 109 but highly cambered airfoil 106 produces lower lift load 109a due to the airfoil stall. This phenomenon reduces the fatigue load envelope 98 to 99 that reduces fatigue loads on the blade assembly and also on the other mechanical parts of wind turbine like rotor and drive train components.

Figure 7:
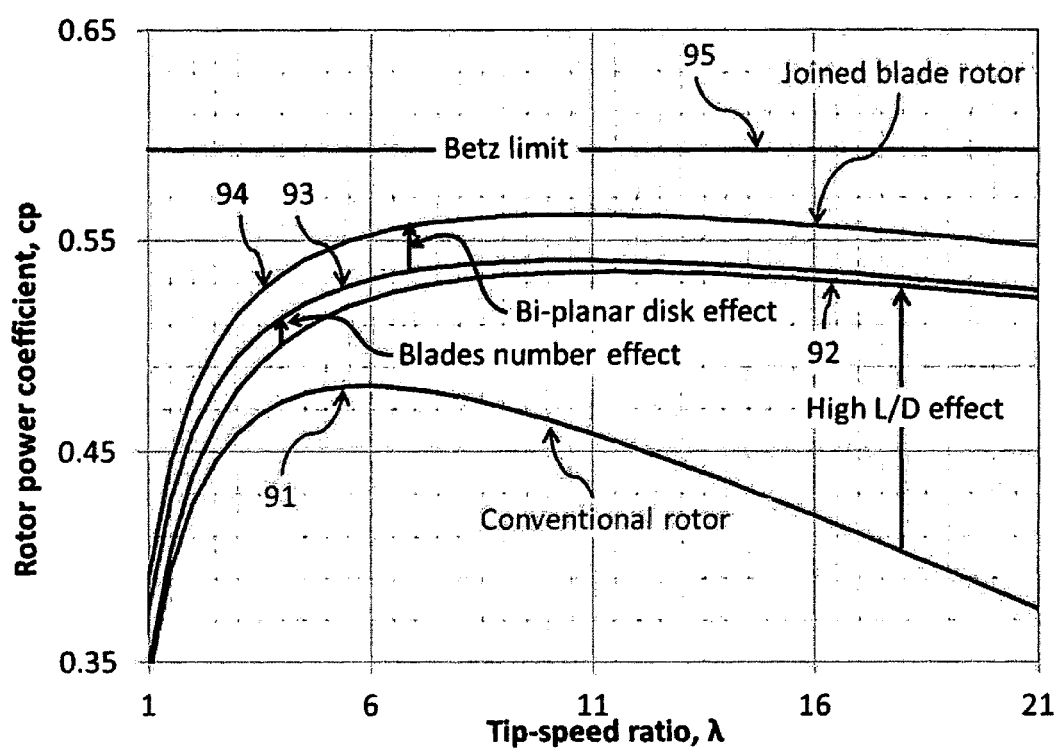
FIG. 7 is a graph showing the power coefficients of conventional wind turbine rotor and joined blade rotor system.

FIG. 7 indicates the power coefficient, Cp curve of conventional wind turbine rotor 91 and final Cp curve 94 of present invention. The following steps describe step by step improvement of Cp due to different properties of joined blade assembly 101 system:

The power coefficient curve of conventional wind turbine rotor 91 is improved to a higher curve 92 using highly cambered airfoils that have higher performance (higher L/D).

With a small number of blades some airflow particles will interact with blades but most will pass between them and, clearly, the reduction of momentum by a particle will depend on its proximity to a blade as the particle passes through the rotor disc. Higher number of blades, increases uniformity of axial induced velocity and decreases energy loses. Instead of single blade, joined blade assembly 2 uses at least two set of blades that improves momentum distribution and Cp of the rotor. Curve 93 shows improvement of Cp curve 92 due to better momentum distribution.

The Betz limit theoretically can be exceeded using bi-planar rotor system. According to main embodiment of the invention, joined blade rotor uses double disk non-planar rotor that ideally can exceed the Betz limit, i.e., bi-planar and non-planar rotors reduce power of tip vortex system of the rotor and increase equivalent diameter of the rotor. Therefore double disk non-planar properties of joined blade rotor system 1 of present invention improve the Cp from curve 93 to final Cp curve 94 as indicated in graph.

Figure 8:
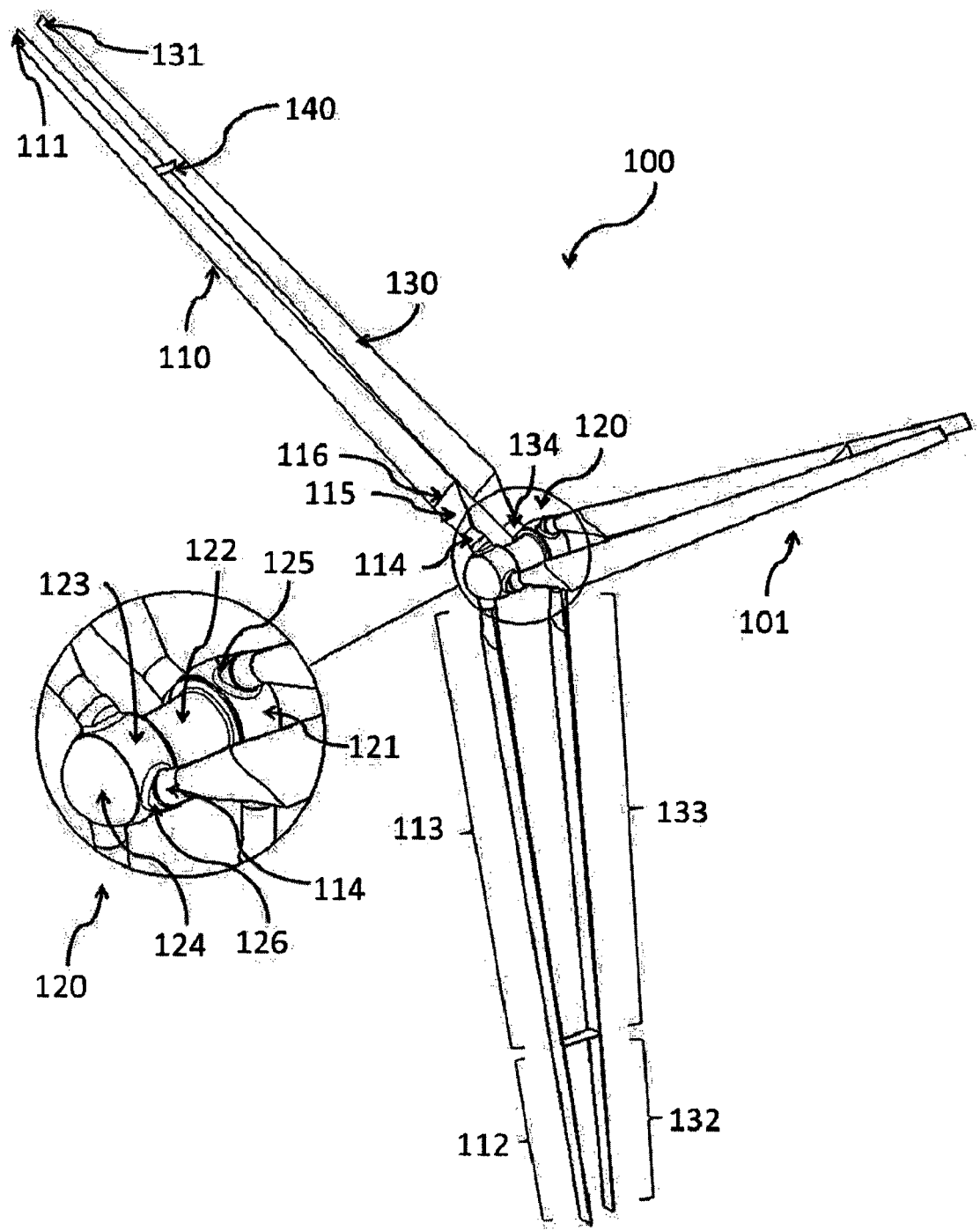
FIG. 8 is a perspective view of second embodiment of the joined blade rotor system using single brace system and central shell-hub.
Figure 9:
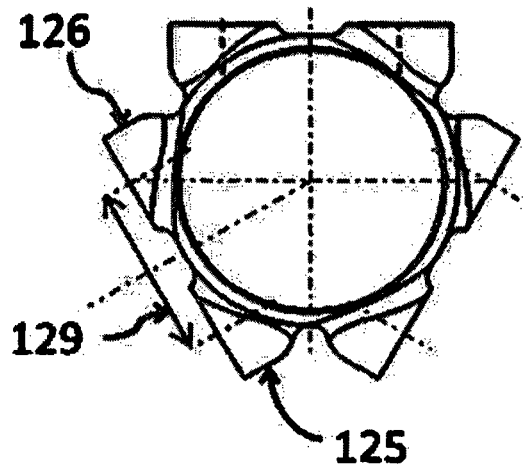
FIG. 9 and FIG. 9a depicted front and side view of the shell-hub assembly.
Figure 9A:
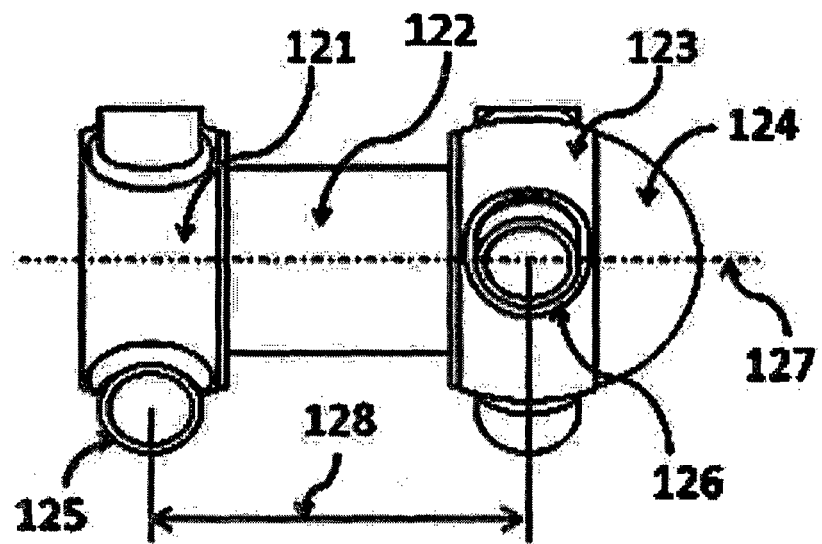

FIG. 8 depicted the second embodiment of present invention which comprising at least two joined blade assembly 101 using unparalleled blades 110 & 130 and shell-hub 120. Gap and stagger distances between first blade 110 and second blade 130 change (normally decrease) by moving toward the blade tips. At least one main brace strut 140 connects first blade 110 to second blade 130. Minimum distance between both blades may happen at the main brace 140 location or another radius over outward blades 112 & 132. Maximum distance between first blade 110 and second blade 130 may happen at attachment points to the central shell-hub 120 by Gap 128 and stagger 129 as shown in FIG. 9 and FIG. 9*a*.

First blade circular root 114 connects to hub front part 123 and second blade circular root 134 connects to hub back part 121. Hub front and back parts 123 & 121 are connected by hub middle part 122. Eccentricity of front and back extensions 126 & 125 provide root stagger distance 129 between blades.

Figure 10:
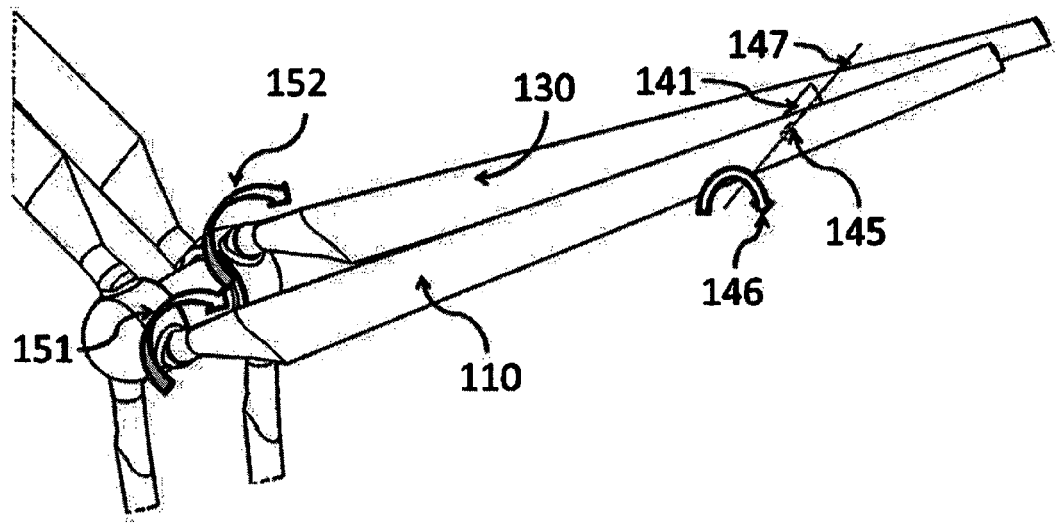
FIG. 10 illustrates blades pitch variation mechanism in second embodiment of present invention.

FIG. 10 indicated principle mechanism of pitch variation in joined blade assembly 101 in variable pitch embodiments and especially second embodiment of present invention. Pitch control motors or actuators cause a first blade rotation 151 and a second blade rotation 152. Due to rotations of first and second blades, a relative rotation 146 between first blade 110 and brace connection 140 happens that is handled by bearing 145 around an axis 147.

Figure 11:
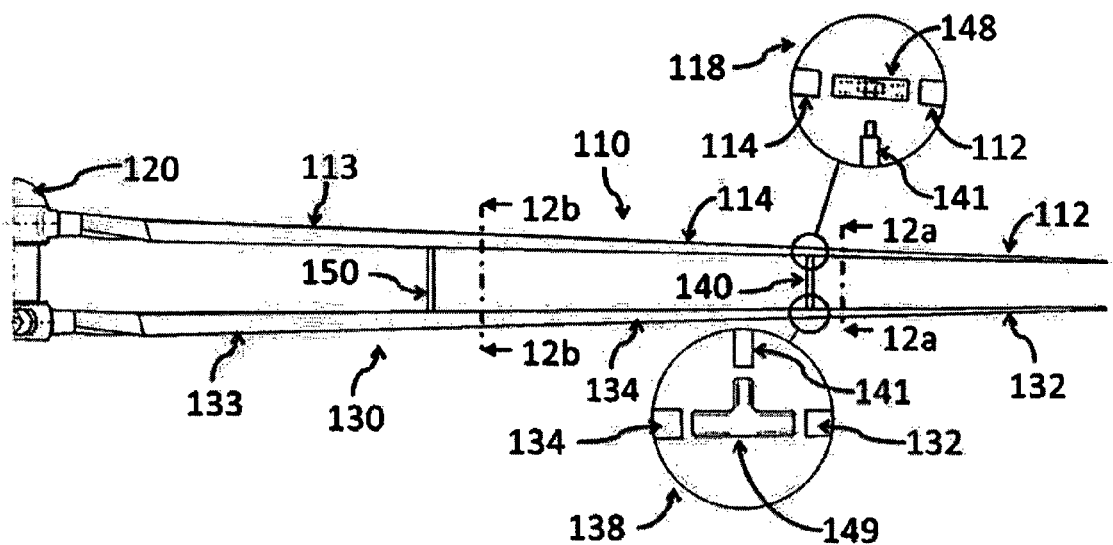
FIG. 11 depicts third embodiment of present invention using two brace systems and shell-hub showing segmentation mechanism in the joined blade assembly.
Figure 12:
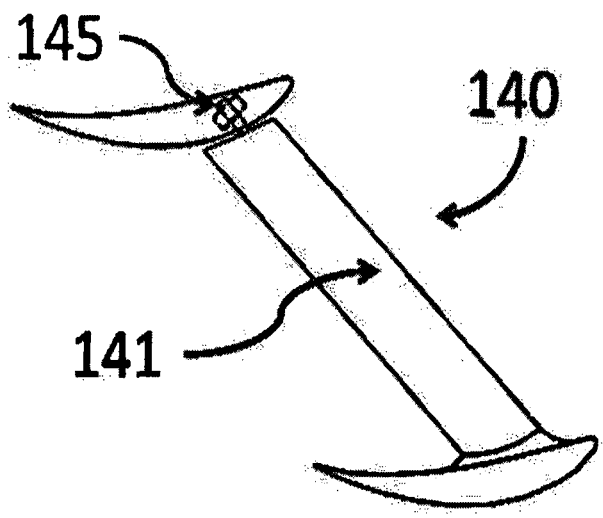
FIG. 12 and FIG. 12a are sectioned view of the taken on lines 12-12 and 12a-12a of FIG. 11 and illustrating the main mechanism of brace and auxiliary brace systems, respectively.
Figure 12A:
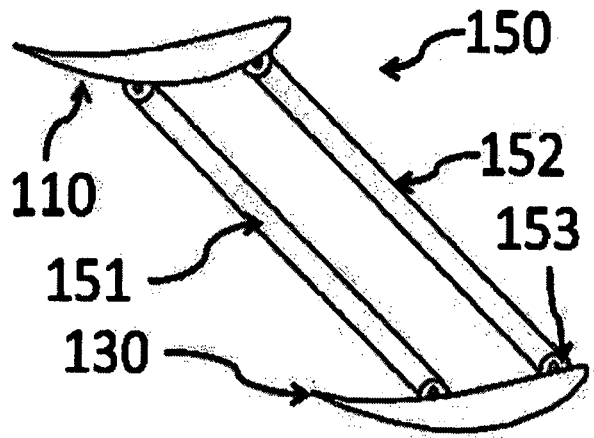
Figure 12B:
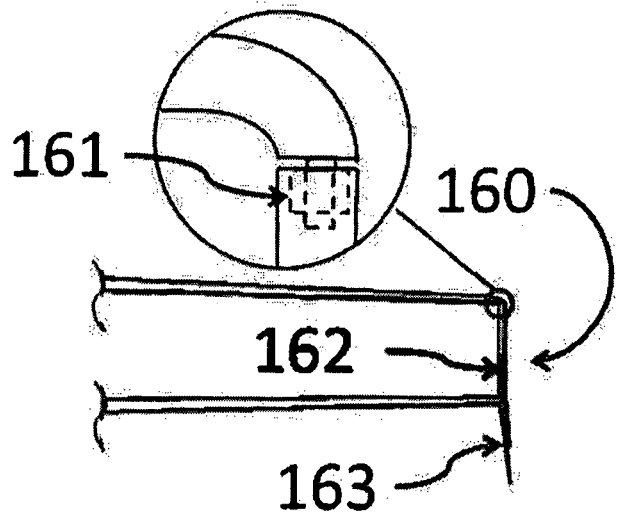
FIG. 12b shows a special condition that main brace system comprising an extension connected tip of the blades.

FIG. 11 depicted third embodiment of present invention using segmented blades. Upper side of main brace strut 141 is connected to junction of mid-board section 114 and outward section 112 of first blade 110 using a hard joint 148 including the bearing 145. Also bottom side of main brace strut 141 is connected to junction of mid-board section 134 and outward section 132 of second blade 130 using a T-joint 149. FIG. 12 shows side view of main brace system and connections to cross sections of blades. Auxiliary brace system 150 also is located between inward and mid-section section of blades. Therefore each single blade comprising 'n+1' main segments which 'n' is the number of brace systems on the joined blade assembly 101. Each connection comprising a hard joint connected to two pieces of blade and one side of brace system. This ability let to manufacture each blade in at least two or more segments that reduces problems and cost during manufacturing, transportation and installation of large blades. FIG. 12*a* presented details of the auxiliary brace cross sectional view of the taken on lines 12*a*-12*a* of FIG. 11. FIG. 12*b* shows a special condition that main brace system 160 comprising internal brace 162 and extension 163 connected tip of the blades. Bearing connection 161 handles relative motion of first blade 110 and brace system 160 while blades pitch angle change.

FIG. 13 is the fourth embodiment of the invention with a V-shaped joined blade assembly 101 that tip of the blades bended toward each other and are connected with a vertical axis joint 241 to handle relative motion of blades 210 & 230 while blade pitch angles change. Also one auxiliary brace system 250 connects intermediate of first blade 210 to similar location on second blade 230.

Figure 14:
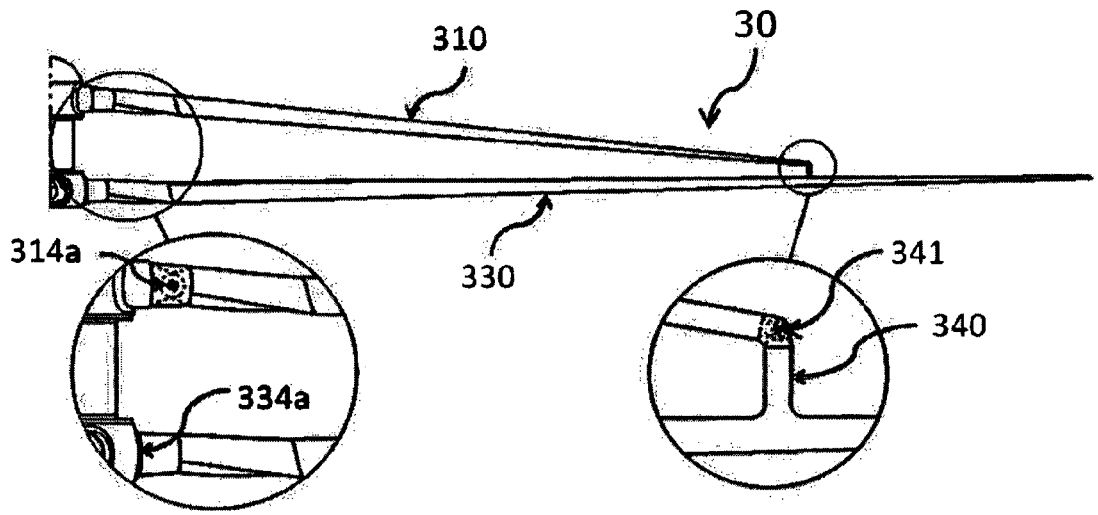
FIG. 14 is the fifth embodiment of the present invention with Y-shaped joined blade assembly comprising a shorter first blade and longer second blade.

FIG. 14 is the fifth embodiment of the present invention with a Y-shaped joined blade assembly 101 comprising a shorter first blade 310 and long second blade 330. First blade is connected to tip of fix strut 340 using a universal pivot joint 341 when first blade root uses a hinged joint 314*a* instead of a cantilever connection or a simple hinged joint when first blade root is cantilever.

Figure 15:
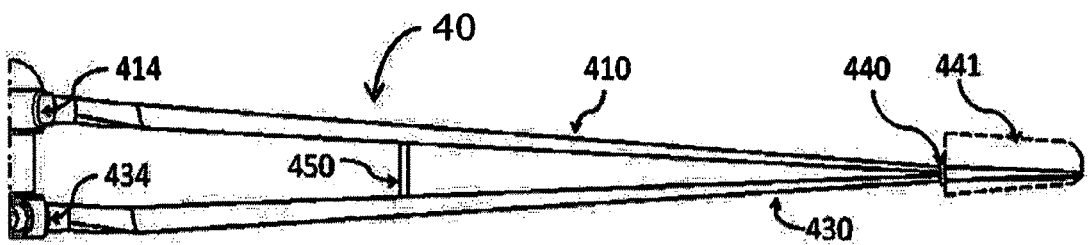
FIG. 15 is the sixth embodiment of the present invention with fix pitch blades and moveable tip as an aerodynamic brake.

FIG. 15 is the sixth embodiment of the present invention with fix pitch blades 410 and 430 that are connected to a fix end plate 440. A movable end blade 441 connected to the end plate 440. A rotatable tip blade 441 is used as an aerodynamic brake for rotor system and usually is activated by the centrifugal force when rotor rotational speed exceeds the speed limit, in order to reinforcement of joined blade assembly 101, one or more fix auxiliary brace systems 450 may connect first and second blades to each other.

FIG. 16 is a perspective view of seventh embodiment of the joined blade rotor system 500 using root mounting frame 550 to carry the first and second blades 510 & 530 or more blades. In each joined blade assembly 501, blades are connected using at least one fix brace system 540. Root mounting frame 550 is connected to a central hub 520 using pitch bearing to provide variable pitch capability. Root mounting frame 550 comprises a blades bedplate 514 that is connected to tubular beams 553-558 and said tubular beams are connected to end flange 551 that is connected to the hub 520 using a pitch bearing. In this embodiment, joined blade assembly 101 totally rotates at hub connection 521 and first blade 510 is constant relative to second blade 530. Therefore brace connection 540 is a fix connection between both blades.

Figure 17:
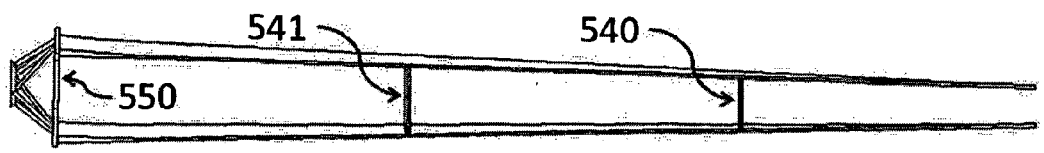
FIG. 17 is a side view of seventh embodiment using root mounting and two brace system.
Figure 18:
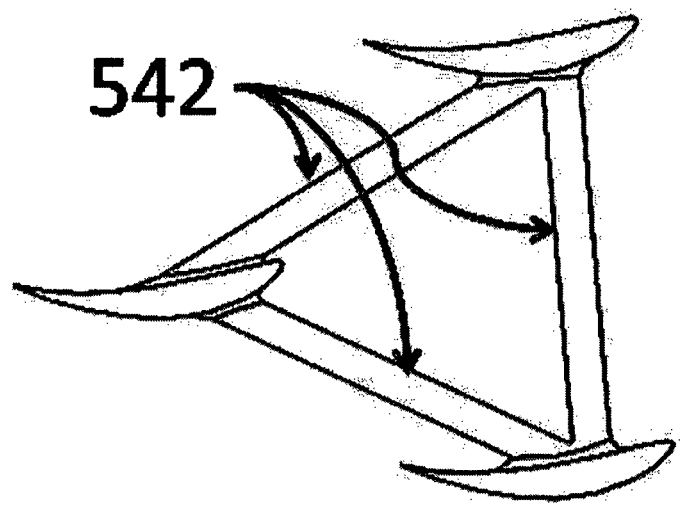
FIG. 18 is sectioned view of the seventh embodiment of joined blade assembly using three blades.

FIG. 17 is a side view of seventh embodiment using root mounting 550 and two fix brace systems 540 & 541. FIG. 18 is sectioned view of the seventh embodiment of joined blade assembly 101 comprising three blades that are connected using three fix brace connections 542 that are located at the same blade radius.

Figure 19:
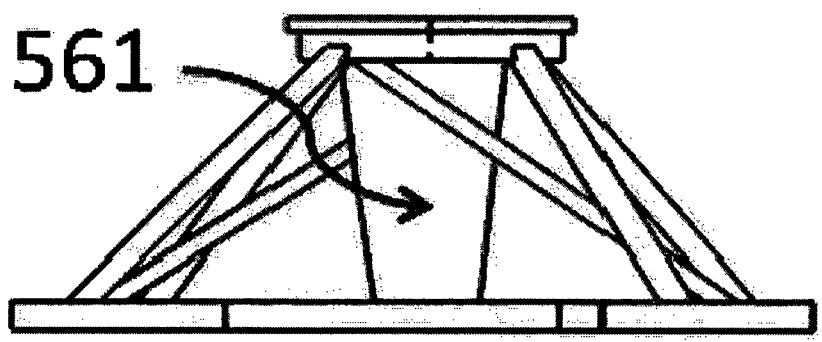
FIG. 19 and FIG. 20 depict other optional root mounting frames for seventh embodiment of FIG. 16.
Figure 20:
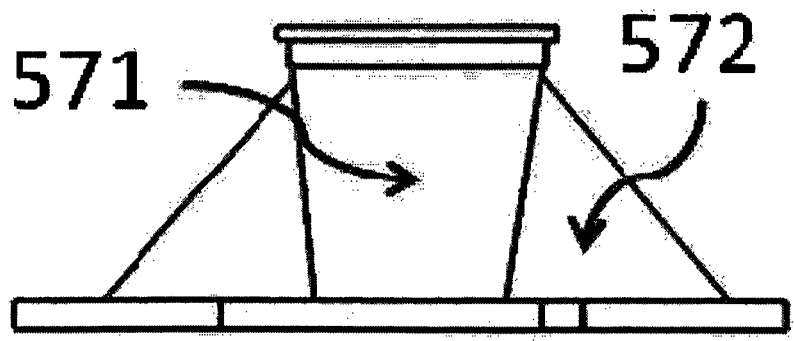

FIG. 19 depicts another option of root mounting frame for seventh embodiment of FIG. 16. Conical tube 561 connected bedplate to root flange to improve stiffness and strength of root mounting frame. Also it is possible to reinforce conical tube 571 using triangular plates 572 instead of using supporting tubular beams 553-558 as shown in FIG. 20.

Figure 21:
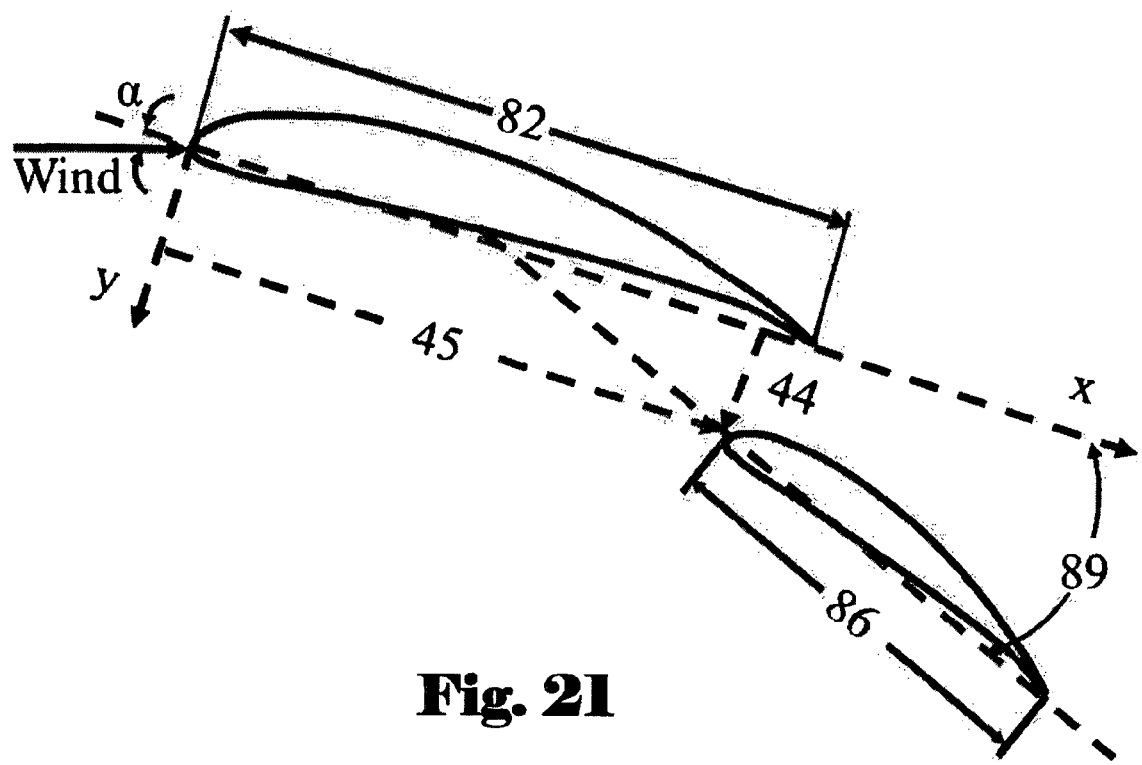
FIG. 21 is a schematic illustration of double-elements airfoil system and relevant parameters.

FIG. 21 shows relative situation of each airfoil in a double-element airfoil system. Five parameters determine the aerodynamic performance of the system including Wind angle of attack (α), stagger (45), gap (44), decalage angle (89) and chord ratio (second airfoil chord, 86 divided to first airfoil chord, 82). In each gap ratio (gap, 44 divided to chord, 82), optimum values of other parameters can be determine to achieve maximum lift-to-drag ratio (L/D). FIG. 22 depicted maximum L/D of double-element airfoil system in a practical range of gap ratio for joined blade rotor system. By increasing the gap ratio maximum L/D decreases and approaches to single airfoil performance when the gap is too high and interaction between airfoils is ignorable. In the practical range of gap ratio, a significant improvement in L/D can be achieved that depends to airfoil types and Reynolds number. Similar improvement in L/D can be achieved in a multi-element airfoil system.

FIG. 23 is a perspective view of a modified configuration of first embodiment of joined blade rotor 1 that the H-shaped joined blade assembly replaced by a Y-shaped joined blade assembly. In this configuration tip of the shorter first blade 10 connected to longer second blade 30 using connection 40. Alternative section 2-2 of FIG. 23 shows a second blade 30 with a jump between chord length of inward section 33 and outward section 32 at blades joint point.

FIG. 24 is a perspective view of modified configuration of seventh embodiment of FIG. 16. Two cross bracing blades 580 connect both sides of strut 540 to roots of blades 510 & 530 in order to stabilize joined blade assembly 501.

FIG. 25 is a side view of the modified joined blade assembly of FIG. 24. FIG. 25a is another modified configuration of seventh embodiment of the present invention that cranked first blade 610 is adjacent to straight second blade 630 over outward region of first blade 610. Cross section 25-25 of joined blade assembly 601 shows a well closed optimized double-element airfoil system to get maximum L/D according to graph of FIG. 22. FIG. 25b is showing a modified configuration of fourth embodiment of the present invention that V-shaped joined blade got an X-shaped form. Large gap in different embodiments of present invention increases non-planar efficiency of joined blade rotor. This configuration (FIG. 25b) shows higher wind speed (V) passing through tip of the first blade than wind speed (v) through other sections of blades that can be described using double-actuator disk theory. According to this theory and using an enough large gap between plan of rotations, optimum theoretical efficiency of rotor can exceed the Betz limit (cp=0.593) and reach to cp=0.64 that is 8% higher than conventional planar rotor. FIG. 25a and FIG. 25b depicted two ultimate aerodynamic aspects of joined blade assembly, i.e., maximized L/D using well closed double-element airfoil system (FIG. 25a) and maximized double actuator disk effect (FIG. 25b). FIG. 26 is a modified form of the fourth embodiment of the invention with a V-shaped joined blade assembly 201 that tip of the blades are connected with an endplate winglet 240 comprising a vertical axis joint 241 to handle relative motion of blades 210 & 230 while blade pitch angles change. Long truss-hub 220a covered with a lightweight aerodynamic fairing 227. Similar tip joined mechanism illustrated in FIG. 27 that endplate winglet 240 modified to one side extension 263.

FIG. 28 is a perspective view of another modified configuration of seventh embodiment of FIG. 16 that H-shaped joined blade assembly 501 got a V-shaped configuration 701. Tip of the shorter first blade 710 connected to longer second blade 730 using connection 740.

Each joined blade assembly may comprise two or more blades. FIG. 29 is the eighth embodiment of the joined blade rotor 800 with a four-blade joined blade assembly 801. First blade 810 supported by second blades 830 using strut connections 840. End of the second blade 830 connected to one ends of the strut 851 and rigging braces 852 & 854. Another ends of struts 851 and rigging brace 852 are connected to tip side of root-base 855 and end of rigging brace 854 connected to the end side of the root-base 855. End side of the root-base 855 connected to shell-hub 820 using a pitch bearing. Cross section of joined blade assembly along line 30-30 in FIG. 30 shows a four-element airfoil section that large central cambered airfoil of blade 810 surrounded by three small airfoil sections of blades 830. Surrounding airfoils can guide airflow in the airfoil system and increase L/D of multi-element airfoil system similar to double-element airfoil system that showed in FIG. 22. Also supporting blades 830 increase flapwise bending, edgewise bending and torsional stiffness of joined blade assembly 801. FIG. 30 also showed a simplified model of joined blade section 30-30 and effect of longitudinal stiffness of second blades 830 in improvement of torsional stiffness of system. If $K_i$ is effective stiffness of $i^{th}$ second blade in plane of rotation θ and $r_i$ is the effective arm of $K_i$ relative to elastic axis then final effective torsional stiffness is:

$$\bar{k}_\theta = k_\theta + \sum_{i=1}^{n} k_i r_i^2$$

High torsional stiffness of the joined blade assembly lets to use highly cambered airfoil in joined blade rotor. Highly cambered airfoils usually have a $CL_{design}$ near to the $CL_{max}$ and reduce fatigue load in joined blade assembly 801 that was illustrated in FIG. 6 schematically.

In order to reduce weight of the shell-hub 820 including pitch bearings a lightweight truss-hub 920 presented in ninth embodiment of joined blade assembly 900 (FIG. 31). Two multi-element joined blade assemblies 901 connected to the lightweight truss-hub 920 that have a pyramid shape with a diamond base. In this embodiment maximum wind shear moment applies to rotor when rotor is in vertical position. In order to reduce wind shear moment, a teetering mechanism considered in truss-hub 920. Teetering bearing 929a and teetering axis is shown in FIG. 32. Outward support 928 including bearing 928a and inward support 927 including bearing 927a hold the joined blade assembly 901 and provide pitch rotation capability. In order to reduce extra teetering load in high wind shear, a teeter-pitch mechanism may connect teetering movement to pitch system through pitch arm 957 (FIG. 33). In wind shear up blade assembly experience higher wind speed than down blade assembly. Higher wind speed generates higher load on up blade assembly that causes unbalanced loads on blades. Resultant torque on rotor tilts the rotor and tilting speed reduces and increases slightly relative wind speed on up and down blade assemblies, respectively. Meanwhile interconnection teeter-pitch system reduces pitch angle of up blade assembly and increase pitch angle of down blade assembly that significantly reduce unbalanced tilting loads due to changing of blade section angle of attacks.

Rigging elements 952 & 954 can adjust Joined blade assembly 901 using a tightening means 956 like turnbuckle that is shown in FIG. 33. After installing the joined blade assembly 901 on hub 920, rigging elements 952 can be installed and rig.

Although the present invention has been described in connection with the specified embodiments, it should not be construed as being in any way limited to the presented examples, e.g., the method can also be used for application in other fluid machineries than those specifically mentioned like propeller or underwater turbine.

As used herein, the terms "comprising" or "comprises" do not exclude other possible elements or steps. Also, the mentioning of references such as "a" or "an" etc. should not be construed as excluding a plurality. Furthermore, individual features mentioned in different embodiments, may possibly be advantageously combined, and the mentioning of these features in different embodiments does not exclude that a combination of features is not possible and advantageous.

Further Details and Aspects of the Invention

Reference is made to FIGS. 1, 8, 16, 23, 24, 26, 28, 29, 31 disclosing embodiments according to the invention of a joined blade rotor system 1, 100, 200, 500, 700, 800, 900 to install on horizontal axis wind turbine. The rotor system comprising a number of joined blade assemblies 2, 101, 201, 201a, 301, 501, 601, 701, 801, 901 extending radially from a central hub 20, 120, 220, 520, 720, 820, 920 having a substantially horizontal axis. Each joined blade assembly 2, 101, 201, 201a, 301, 501, 601, 701, 801, 901 comprises at least two blades (an example is shown in FIG. 1), a first blade 10, 110, 210, 310, 410, 510, 610, 710, 810, 910 and a second blade 30, 130, 230, 330, 430, 530, 630, 730, 830, 930 or more blades (an example is shown in FIG. 30) in different rotor planes. The first and second blades are connected by one or more brace systems 40, 140, 150, 160, 240, 250, 260, 340, 340a, 450, 540, 541, 640, 740, 840, 940 (an example is shown in FIG. 2) to each other.

The brace systems 40, 140, 150, 160, 240, 250, 260, 340, 340a, 450, 540, 541, 640, 740, 840, 940 comprise brace struts 41, 141, 262, 542 (an example is shown in FIG. 12) that are hinged or rigidly connected to second blade 30, 130, 230, 330, 430, 530, 630, 730, 830, 930 and are hinged or rigidly connected to first blade 10, 110, 210, 310, 410, 510, 610, 710, 810.

The first blade(s) 10, 110, 210, 310, 410, 510, 610, 710, 810, 910 and the second blade(s) 30, 130, 230, 330, 430, 530, 630, 730, 830, 930 are connected to a central hub 20, 120, 220, 520, 720, 820, 920 directly (an example is shown in FIG. 8) or using a root mounting 550, 750, 850, 950 (an example is shown in FIG. 16) and pitch bearings with a gap 28, 128 and a stagger 29, 129 distances (an example is shown in FIG. 4).

Reference is made to FIGS. 1, 9, 26 showing embodiments according to the invention of a joined blade rotor system 1, 200 wherein the central hub is a truss-hub 20, 220a comprising a central shaft 21, 221 connected to radial extending front and back tubes 27, 227, 223, 23, said back tubes 23, 223 are reinforced by tubular elements 24, 224 and plates 23a, and said front and back tubes 27, 227, 223, 23 are connected to each other using tubular elements 25, 26, 225, 226 and a flange 22, 222 is connected to central shaft 21, 221 and supporting plates 23a in order to connect the truss-hub 20, 220a to the wind turbine drive train.

Reference is made to FIGS. 8 & 13 showing embodiments according to the invention of a joined blade rotor system 100 where the central hub is a shell-hub 120, 220 comprises a central shaft 122, a back hub section 121, a front hub section 123 and a nose fairing 124; the hub sections comprising eccentric extension 125, 126 relative to axis of hub 120, 220 that provides a stagger 129 and a gap 128 for blade root connection 114, 414, 434.

Reference is made to FIGS. 3, 11, 12a, 15, 17 showing embodiments according to the invention of a joined blade rotor system 1, 100, 200, 500, 700, 800, 900 each joined blade assembly 2, 101, 201, 201a, 301, 501, 601, 701, 801, 901 comprising at least one auxiliary brace system 50, 150, 250, 541 which connects mid-section of inward parts of the first blade 10, 110, 210, 310, 410, 510, 610, 710, 810, 910 and the second blade 30, 130, 230, 330, 430, 530, 630, 730, 830, 930 as shown in FIGS. 11 & 17 and having a front brace link 52, 152 and a back brace link 51, 151 (FIGS. 3 & 12a) each connected to the first blade 10, 110, 210, 310, 410, 510, 610, 710, 810, 910 and the second blade 30, 130, 230, 330, 430, 530, 630, 730, 830, 930 using rigid connections or hinged lugs 53, 153.

The invention relates to embodiments of a joined blade rotor system 1, 100, 200, 500, 700, 800, 900 wherein each first blade 10, 110, 210, 310, 410, 510, 610, 710, 810, 910 and each second blade 30, 130, 230, 330, 430, 530, 630, 730, 830, 930 comprising a series of blade profile sections 81, taken in a plane orientated perpendicular to longitudinal axis of blade, having thickness ratio and camber ratio of the profile 81 as shown in FIG. 5 are approximately 10-30% and 2-6%, respectively.

The invention relates to embodiments of a joined blade rotor system 1, 100, 200, 500, 700, 800, 900, wherein each first blade 10, 110, 210, 310, 410, 510, 610, 710, 810, 910 and each second blade 30, 130, 230, 330, 430, 530, 630, 730, 830, 930 comprising a series of blade profile sections 81 as shown in FIG. 5, taken in a plane orientated perpendicular to longitudinal axis of blade, having thickness ratio and camber ratio of the profile 81 are up to 100% and 50%, respectively.

The invention relates to embodiments of a joined blade rotor system 10, 110, 210, 310, 410, 510, 710 wherein each profile section of the front blade 10, 110, 210, 310, 410, 510, 710 and the second blade 30, 130, 230, 330, 430, 530, 730 comprising a double-section profile according to FIG. 21, optionally having different shape and size have a gap 44, stagger 45 and relative decalage angle 89.

The invention relates to embodiments of a joined blade rotor system 1, 100, 200, 500, 700, 800, 900 wherein the central hub 20, 120, 220, 520, 720, 820, 920 comprising operating means to effect a pitch rotation of root mounting 550, 750, 850, 950 that are shown in FIGS. 17, 25a, 28, 30, 33 or directly the first blade pitch rotation 151 and the second blade pitch rotation 152 about the respective blade axis as shown in FIG. 10.

The invention relates to embodiments of a joined blade rotor system 1, 100, 200 wherein a bearing 45, 145, 161, 241, 341 provides a relative rotation 146 between the first or the second blade 10, 110, 210, 310, 30, 130, 230, 330 and the brace strut 41, 141, 340 around a longitudinal direction of the brace strut as shown in FIG. 10 during variation of pitch angles.

The invention relates to embodiments of a joined blade rotor system 1, 100, 200, 500, 700, 800, 900, wherein a main brace system 40, 140, 340, 540, 740, 840, 940 keeps the gap 44, stagger 45 and relative angle between the first blade 10, 110, 210, 310, 410, 510, 710, 810, 910 and the second blade 30, 130, 230, 330, 430, 530, 730, 830, 930 fixed as shown in FIG. 12 during variation of pitch angles.

The invention relates to embodiments of a joined blade rotor system 1, 100, 200, 500, 700, 800, 900, wherein an auxiliary brace system 50, 150, 250 keeps the relative angle between the first blade 10, 110, 210, 310, 410, 510, 710, 810, 910 and the second blade 30, 130, 230, 330, 430, 530, 730, 830, 930 fixed during variation of pitch angles as shown in FIG. 12a.

The invention relates to embodiments of a joined blade rotor system 1, 100, 200, 500, 700, 800, 900 wherein each joined blade assembly 2, 101, 201, 201a, 301, 501, 601, 701, 801, 901 comprises at least one second blade-brace connection point 138 as shown in FIG. 11 and one first blade-brace connection point 118 which divide blades to some segments 112, 113, 114, 132, 133, 134 and each brace connection point 138 comprises a hinged or fixed joint 149, 148 that connects two adjacent blade segments 112, 113, 114, 132, 133, 134 and at least one brace strut/link 41, 51, 52, 141, 151, 152, 542.

The invention relates to embodiments of a joined blade rotor system 1, 100, 200, 500, 700, 800, 900 wherein each joined blade assembly 2, 101, 201, 201a, 301, 501, 601, 701, 801, 901 comprises a brace system 40, 140, 150, 160, 540, 740, 840, 940 having an extension connection 163 at mid or end of a blade (FIG. 12b) and a bearing connection 161 at mid or end of the another blade.

The invention relates to embodiments of a joined blade rotor system 1, 100, 200, 500, 700 wherein each joined blade assembly 2, 101, 201, 201a, 301, 501, 601, 701 comprising a second blade 30, 130, 230, 530, 730 and a first blade 10, 110, 210, 310, 510, 710 which tip of the said blades bended toward the each other (FIG. 13) and the first and the second blade(s) are interconnected rigidly or using a vertical axis bearing joint 241 to provide flexibility during variation of pitch angle of blades.

The invention relates to embodiments of a joined blade rotor system 1, 100, 200, 500, 700, 800, 900 wherein each joined blade assembly 2, 101, 201, 201a, 301, 501, 601, 701, 801, 901 comprising a longer blade 30, 130, 230, 330, 530, 710, 810, 910 and a shorter blade 10, 110, 210, 310, 510, 730, 830, 930 that has a fixed or rotating means 341 as shown in FIG. 14 to connect the blades to main brace system 40, 140, 240, 340, 540, 740, 840, 940.

The invention relates to embodiments of a joined blade rotor system 1, 100, 200, wherein the rotating means 341 (FIG. 14) at each end of the main brace system 40, 140, 240, 340, 540, 740, 840, 940 comprising a fixed, hinged or universal pivot joint and each blade root connection comprising a fixed, hinged or universal joint 314a, 334a.

The invention relates to embodiments of a joined blade rotor system 1, 100, 200, 500, 700, 800, 900 wherein each joined blade assembly 2, 101, 201, 201a, 301, 401, 501, 601, 701, 801, 901 wherein the second blade is a fixed pitch blade 30, 130, 230, 330, 430, 530, 630, 730, 830, 930 and the first blade is a fixed pitch blade 10, 110, 210, 310, 410, 510, 610, 710, 810, 910 that are connected to a fixed brace or a fix end plate 440 as shown in FIG. 15 and a rotatable tip blade 441 connected to the end plate 440 that is movable between aligned position 441 for normal operation and braking position 442.

The invention relates to embodiments of a joined blade rotor system 500, 700, 800, 900, wherein each joined blade assembly 501, 601, 701, 801, 901 comprising a root mounting frame 550, 650, 750, 850, 950 as shown in FIGS. 17, 25a, 28, 30 and 33 to carry the first blade 510, 610, 710, 810, 910 and the second blade 530, 630, 730, 830, 930 that are connected to each other using at least one fix brace system 540, 541, 640, 740, 840, 840 and are connected to the root mounting frame 550, 650, 750, 850, 950 that is connected to a central hub 520, 720, 820, 920 using a pitch bearing.

Reference is made to FIG. 24 showing an embodiment of a joined blade rotor system 500 wherein each joined blade assembly 501 further comprising at least two cross blades 580 wherein each of said cross blades connect root of first or second blade 510, 530 to opposite end of brace system 540.

Reference is made to FIGS. 16, 24, 28 showing embodiments according to the invention of joined blade rotor system 500, 700, wherein each root mounting frame 550, 750 comprising a blades bedplate 552 that is connected to tubular beams 553-558 and wherein said tubular beams are connected to an end flange 551 that is connected to the hub 520, 720 using a pitch bearing.

Reference is made to FIGS. 24, 30, 33 showing embodiments according to the invention of a joined blade rotor system 500, 700, 800, 900, wherein each joined blade assembly 501, 601, 701, 801, 901 comprises three or more blades that are interconnected by at least one fixed brace system 540, 541, 640, 740, 840, 940 using fixed struts 542.

The invention relates to embodiments of a joined blade rotor system 500, 700, wherein each root mounting frame 550, 750 comprising a conical tube 561, 571 (FIGS. 19 & 20) and tubular beams 553-558 (FIGS. 16 & 24) or supporting plates 572 (FIG. 20) to connect bedplate 552 to an end flange 551 (FIGS. 16 & 24).

The invention relates to embodiments of a joined blade rotor system 1, 100, 500, 700, 800, 900, wherein each joined blade assembly 2, 101, 501, 601, 701, 801, 901 comprising a first straight or cranked blade 610 (FIGS. 25a & 25b) that is connected to a second straight or cranked blade 630 using at least one fixed brace system 340a, 640 where said blades remain adjacent to each other (FIG. 25a) or divert (FIG. 25b) along the outward region of the said blades.

Reference is made to FIG. 29 to FIG. 33 showing embodiments according to the invention of a joined blade rotor system 800, 900, having at least two joined blade assembly 801, 901 comprising a root mounting frame 850, 950 to carry a first blade 810, 910 and second blade(s) 830, 930 that are connected to the first blade 810, 910 at an outward end of the second blades and are connected to mounting frame 850, 950 at an inward end of the second blades, and the root mounting frame 850, 950 is connected to a central hub 820, 920 using a single pitch bearing or pitch bearing pairs 927a, 928a (FIG. 32).

The invention relates to embodiments of a joined blade rotor system, wherein a cross section of the joined blade assembly 801, 901 passing through first blade 810, 910 and second blade(s) 830, 930 describes a multi-element airfoil system (as shown by section 30-30 of FIG. 30) wherein a larger central cambered airfoil of first blade 810, 910 is surrounded by at least two or more smaller airfoils of second blades 830.

Reference is made to FIG. 29 & FIG. 30 showing an embodiment according to the invention of a joined blade rotor system 800, wherein each root mounting frame 850 comprising a root base 855 that is connected to first end of tubular struts 851 and first end of rigging braces 852, and second ends of said tubular struts 851 are connected to inward ends of auxiliary blades 830, meanwhile second ends of said tubular struts 851 are laterally connected to each other using rigging braces 854.

Reference is made to FIG. 31 to FIG. 33 showing an embodiment according to the invention of a joined blade rotor system 900, wherein the central hub is a truss-hub 920 comprising a series of tubular truss elements 922-926 having two outward bearing housings 928 including outward pitch bearing 928a and inward bearing housings 927 including inward pitch bearing 927a holding base shaft 955 that carry joined blade assembly 901.

Reference is made to FIG. 32 & FIG. 33 showing an embodiment according to the invention of a joined blade rotor system 900 wherein the truss-hub 920 comprising a hub base 921 that hold a pyramid-shaped part of the truss-hub 920 using supports 929 including teetering bearings 929a that a teeter-pitch system interconnects teetering rotation to pitch arms 957 in order to set the pitch angle of each joined blade assembly 901 separately.

The invention claimed is:

1. A joined blade rotor system to install on or forming part of a horizontal axis wind turbine, the joined blade rotor system comprising:
   a plurality of joined blade assemblies extending radially from a central hub having a substantially horizontal axis;
   wherein
   each joined blade assembly comprises at least two blades, a first blade and a second blade or more blades in different rotor planes, said first and second blades are connected by one or more brace systems to each other;
   the one or more brace systems comprising brace struts hingedly or rigidly connected to the second blade and hingedly or rigidly connected to the first blade, the brace struts being rigidly connected to at least either the second blade or the first blade and
   the first and the second blades are connected to the central hub directly or using a root mounting and pitch bearings with a gap and a stagger distance.

2. A joined blade rotor system according to claim 1, wherein the central hub is a truss-hub comprising a central shaft connected to radial extending front and back tubes, said back tubes are reinforced by tubular elements and plates, and said front and back tubes are connected to each other using tubular elements and a flange is connected to the central shaft and supporting plates in order to connect the truss-hub to a wind turbine drive train.

3. A joined blade rotor system according to claim 1, wherein the central hub is a shell-hub comprising a central shaft, a back hub section, a front hub section and a nose fairing; the back and front hub sections comprising an eccentric extension relative to an axis of the shell-hub that provides a stagger and a gap for a blade root connection.

4. A joined blade rotor system according to claim 1, wherein each joined blade assembly comprises at least one auxiliary brace system which connects a mid-section of inward parts of the first blade and the second blade and having a front brace link and a back brace link each connected to the first blade and the second blade using rigid connections or hinged lugs.

5. A joined blade rotor system according to claim 1, wherein each first blade and each second blade comprise a series of blade profile sections, taken in a plane orientated perpendicular to a longitudinal axis of each blade, having a thickness ratio and a camber ratio of the profile sections that are approximately 10-30% and 2-6%, respectively.

6. A joined blade rotor system according to claim 1, wherein each first blade and each second blade comprise a series of blade profile sections, taken in a plane orientated perpendicular to a longitudinal axis of each blade, having a thickness ratio and a camber ratio of the profile sections that are up to 100% and 50%, respectively.

7. A joined blade rotor system according to claim 5, wherein each profile section of the first blade and the second blade comprise a double-section profile, and having a gap, a stagger and a relative decalage angle.

8. A joined blade rotor system according to claim 1, wherein the central hub comprises an operating member to effect either a pitch rotation of the root mounting or direct a first blade pitch rotation and a second blade pitch rotation about a respective blade axis.

9. A joined blade rotor system according to claim 7, wherein a bearing provides a relative rotation between the first or the second blade and the brace strut around a longitudinal direction of a brace strut axis during variation of pitch angles.

10. A joined blade rotor system according to claim 7, wherein a main brace system keeps the gap, stagger and relative angle between the first blade and the second blade fixed during variation of pitch angles.

11. A joined blade rotor system according to claim 1, wherein an auxiliary brace system keeps a relative angle between the first blade and the second blade fixed during variation of pitch angles.

12. A joined blade rotor system according to claim 1, wherein each joined blade assembly comprises at least one second blade-brace connection point and at least one first blade-brace connection point which divide the first and second blades into blade segments and each brace connection point comprises a hinged or fixed joint that connects two adjacent blade segments and at least one brace strut/link.

13. A joined blade rotor system according to claim 1, wherein each joined blade assembly comprises a brace system having an extension connection at a mid point or an end of a blade and a bearing connection at a mid point or an end of another blade.

14. A joined blade rotor system according to claim 1, wherein each joined blade assembly comprises a second blade and a first blade each of the first and second blades having a tip bent toward the each other, the first and the second blades are interconnected rigidly or using a vertical axis bearing joint to provide flexibility during variation of a pitch angle of the first and second blades.

15. A joined blade rotor system according to claim 1, wherein each joined blade assembly comprises a longer blade and a shorter blade that has a rotating member to connect the blades to the brace system.

16. A joined blade rotor system according to claim 15, wherein the rotating member at each end of the brace system comprises a hinged or universal pivot joint and each blade root connection comprises a fixed or hinged joint.

17. A joined blade rotor system according to claim 1, wherein the second blade is a fixed pitch blade and the first blade is a fixed pitch blade that are connected to a fixed brace or a fixed end plate and a rotatable tip blade connected to the fixed end plate that is movable between an aligned position for normal operation and a braking position.

18. A joined blade rotor system according to claim 1, wherein each joined blade assembly comprises a root mounting frame to carry the first blade and the second blade that are connected to each other using at least one brace system and are connected to the root mounting frame that is connected to a central hub using a pitch bearing.

19. A joined blade rotor system according to claim 18, wherein each joined blade assembly further comprises at least two cross blades wherein each of said cross blades connects a root of the first or second blade to an opposite end of the brace system.

20. A joined blade rotor system according to claim 18, wherein each root mounting frame comprising a blade bedplate that is connected to tubular beams and wherein said tubular beams are connected to an end flange that is connected to the central hub using a pitch bearing.

21. A joined blade rotor system according to claim 18, wherein each joined blade assembly comprises three or more blades that are interconnected by at least one brace system using struts.

22. A joined blade rotor system according to claim 18, wherein each root mounting frame comprises a conical tube and tubular beams or supporting plates to connect a bedplate to an end flange.

23. A joined blade rotor system according to claim 1, wherein each joined blade assembly comprises a first straight or cranked blade that is connected to a second straight or cranked blade using at least one brace system where said blades remain adjacent to each other or divert along an outward region of said blades.

24. A joined blade rotor system according to claim 1, having at least two joined blade assemblies comprising a root mounting frame to carry the first and second blades that are connected to the first blade at an outward end of the second blades and are connected to the root mounting frame at an inward end of the second blades, and the root mounting frame is connected to a central hub using a single pitch bearing or pitch bearing pairs.

25. A joined blade rotor system according to claim 24, wherein a cross section of the joined blade assembly passing through the first and second blades comprises a multi-element airfoil system wherein a larger central cambered airfoil of the first blade is surrounded by at least two or more smaller airfoils of the second blades.

26. A joined blade rotor system according to claim 24, wherein each root mounting frame comprises a root base that is connected to first end of tubular struts and first end of rigging braces, and second ends of said tubular struts are connected to inward ends of auxiliary blades, and second ends of said tubular struts are laterally connected to each other using rigging braces.

27. A joined blade rotor system according to claim 24, wherein the central hub is a truss-hub comprising a series of tubular truss elements having two outward bearing housings including an outward pitch bearing and an inward bearing housing including an inward pitch bearing holding base shaft that carry the joined blade assembly.

28. A joined blade rotor system according to claim 27, wherein the truss-hub comprises a hub base that holds a pyramid-shaped part of the truss-hub using supports including teetering bearings and a teeter-pitch system that interconnects a teetering rotation to the pitch rotation through pitch arms in order to modify a pitch angle of each joined blade assembly according to a teeter angle.

* * * * *